United States Patent
Hashimoto et al.

(10) Patent No.: US 7,394,222 B2
(45) Date of Patent: Jul. 1, 2008

(54) POWER SUPPLY APPARATUS WITH FUNCTION FOR CORRECTING FOR ERRONEOUS DETECTION

(75) Inventors: Eiichiro Hashimoto, Kyoto (JP); Kimihiko Furukawa, Kakogawa (JP); Ryuji Yoshihara, Akashi (JP)

(73) Assignee: Sanyo Electric Co., Ltd., Osaka (JP)

( * ) Notice: Subject to any disclaimer, the term of this patent is extended or adjusted under 35 U.S.C. 154(b) by 132 days.

(21) Appl. No.: 11/095,667

(22) Filed: Apr. 1, 2005

(65) Prior Publication Data
US 2005/0225290 A1 Oct. 13, 2005

(30) Foreign Application Priority Data
Apr. 9, 2004 (JP) .............................. 2004-115707
Feb. 24, 2005 (JP) .............................. 2005-049269

(51) Int. Cl.
*H02J 7/00* (2006.01)
(52) U.S. Cl. ...................... 320/116; 320/119
(58) Field of Classification Search ......... 320/110–116, 320/155, 132, 119–120, 124, 127, 118
See application file for complete search history.

(56) References Cited

U.S. PATENT DOCUMENTS

| 5,773,958 | A | * | 6/1998 | Gow et al. .................. 320/118 |
| 5,998,969 | A | * | 12/1999 | Tsuji et al. .................. 320/132 |
| 6,031,354 | A | * | 2/2000 | Wiley et al. .................. 320/116 |
| 6,417,648 | B2 | * | 7/2002 | Suzuki et al. ................ 320/136 |
| 6,462,510 | B1 | * | 10/2002 | Takada et al. ................ 320/116 |
| 6,563,291 | B2 | * | 5/2003 | Tamura et al. ............... 320/116 |
| 2002/0011820 | A1 | * | 1/2002 | Suzuki et al. ................ 320/132 |
| 2003/0044689 | A1 | * | 3/2003 | Miyazaki et al. ............. 429/320 |
| 2005/0043859 | A1 | * | 2/2005 | Tsai et al. .................... 700/286 |

FOREIGN PATENT DOCUMENTS

JP 10-270094 10/1998

* cited by examiner

*Primary Examiner*—Adolf Berhane
*Assistant Examiner*—M'Baye Diao
(74) *Attorney, Agent, or Firm*—McDermott Will & Emery LLP

(57) ABSTRACT

A power supply apparatus has a battery that is composed of a plurality of battery modules connected in series, a voltage detector that detects the relative voltages at the individual nodes between the battery modules with respect to a predetermined reference node, an erroneous detection checker that checks whether each of the detected relative voltages is an erroneously detected voltage and a normally detected voltage, and a calculation circuit that calculates the voltages of the individual battery modules based on those relative voltages that are judged to be normally detected voltages. If any of the nodes is recognized as an erroneous detection node as a result of an erroneously detected voltage being detected thereat, the calculation circuit calculates, based on the relative voltages detected at the two nodes located adjacent to the erroneous detection node, a recovery voltage, and then, by replacing the relative voltage detected at the erroneous detection node with the recovery voltage, calculates the voltages of the battery modules.

17 Claims, 5 Drawing Sheets

POWER SUPPLY APPARATUS WITH FUNCTION FOR CORRECTING FOR ERRONEOUS DETECTION

This application is based on Japanese Patent Applications Nos. 2004-115707 and 2005-049269 filed on Apr. 9, 2004 and Feb. 24, 2005, respectively, the contents of which are hereby incorporated by reference.

BACKGROUND OF THE INVENTION

1. Field of the Invention

The present invention relates to a power supply apparatus, and more particularly to a power supply apparatus that can detect the voltages of the individual battery modules constituting a vehicle-driving battery for driving a motor for making a vehicle run.

2. Description of Related Art

A vehicle-oriented power supply apparatus drives a motor for making the vehicle run. The motor is required to yield an output sufficiently high to make the vehicle run. To make the motor yield a high output, the vehicle-oriented power supply apparatus is typically designed to yield an extremely high output voltage of 200 V to 400V. To produce such a high output voltage, the power supply apparatus incorporates a vehicle-driving battery having a large number of battery modules connected in series. Moreover, each battery module is composed of a plurality of secondary cells connected in series. Used as the secondary cells are, for example, nickel hydride cells or lithium ion secondary cells.

In a vehicle-driving battery composed of a large number of battery modules, an equal charge/discharge current flows through all the battery modules. However, not all the battery modules have identical electrical characteristics. For example, when any of the battery modules deteriorates to have a lower full-charge capacity, this battery module becomes prone to be overcharged and overdischarged. Overcharging and overdischarging make batteries deteriorate. Thus, if any of the battery modules deteriorates, this battery module tends to deteriorate faster. To prevent this inconvenience, in a vehicle-oriented power supply apparatus, the voltages of all the battery modules are detected. The voltages of the battery modules are important indicators of their states. Based on these indicators, the charging and discharging of the vehicle-driving battery are controlled while protection is provided for the individual battery modules.

In a power supply apparatus that is composed of a large number of battery modules connected in series and that detects the voltages of all the battery modules, it is difficult to always accurately detect the voltages of the individual battery modules. This is because detecting the voltages of the individual battery modules requires the use of a large number of long leads, and because connecting those leads requires the use of a large number of connectors. Moreover, a vehicle-oriented power supply apparatus is used in an environment involving extremely harsh extrinsic conditions in terms of, for example, temperature and humidity, and this too makes the detection of the voltages of a large number of battery modules difficult. Furthermore, a vehicle is used in a harsh environment for a long period of time, and this makes the contacts of connectors prone to get soiled and oxidized. This makes accurate detection of the voltages of the battery modules further difficult.

Consider, for example, a vehicle-oriented power supply apparatus composed of 50 battery modules connected in series. If the charging or discharging of the vehicle-driving battery is restricted or inhibited just because the voltage of one battery module cannot be detected normally, the normal running of the vehicle will be severely limited. To avoid this inconvenience, there have conventionally been developed techniques that leave the running of a vehicle unlimited when simply the normal detection of the voltage of a battery module is found impossible and not that the actually detected voltage of a battery module is found abnormal. One example of such a technique is disclosed in Japanese Patent Application Laid-Open No. H11-176480 (hereinafter Patent Publication 1).

The power supply apparatus disclosed in Patent Publication 1 mentioned above detects the voltages of individual battery modules and the overall voltage of a vehicle-driving battery. Then, based on the voltages of the individual battery modules, information on their respective states is fed to an electronic control unit, and, based on the overall voltage, information on the state of the entire stack of batteries is fed to the electronic control unit. For each of the overall voltage and the individual battery module voltages, whether or not it is detected normally is checked. If the overall voltage is found to be detected erroneously, the voltages of the battery modules are added together so as to be used as the corrected overall voltage. If the voltage of a given battery module is found to be detected erroneously, either the mean value of the voltages of the battery modules as calculated from the overall voltage or the value calculated by subtracting the sum of the voltages of the normal battery modules from the overall voltage is used as the corrected voltage of the given battery module.

Disadvantageously, however, this method requires the detection of both the overall voltage and the voltages of the individual battery modules, and thus requires complicated arithmetic processing.

SUMMARY OF THE INVENTION

In view of the conventionally experienced inconveniences mentioned above, it is an object of the present invention to provide a power supply apparatus that permits battery module voltages or their relative voltages to be corrected easily even when they are detected erroneously (abnormally).

To achieve the above object, according to a first aspect of the present invention, a power supply apparatus is provided with: a battery that is composed of n (where n is an integer equal to or greater than 2) battery modules connected in series; a voltage detection circuit that detects the voltages of the individual battery modules of the battery; and an electronic control unit that controls the charging and discharging of the battery based on the voltages of the individual battery modules as detected by the voltage detection circuit. Here, the voltage detection circuit is provided with: a voltage detector that detects the relative voltages between a predetermined reference node within the battery and each of the nodes between the battery modules connected in series; an erroneous detection checker that checks whether each of the relative voltages detected by the voltage detector is an erroneously detected voltage or a normally detected voltage; and a calculation circuit that calculates the voltages of the individual battery modules based on the relative voltages judged to be normally detected voltages. If one of the nodes is recognized as an erroneous detection node as a result of the corresponding relative voltage being judged to be an erroneously detected voltage by the erroneous detection checker, the calculation circuit calculates, based on the relative voltages detected at the two nodes located adjacently on the positive and negative sides of the erroneous detection node, a recovery voltage for the erroneous detection node, and then, by replacing the relative voltage detected at the erroneous detection node with the recovery voltage, calculates the voltages of the battery modules.

With this circuit configuration, even when a fault occurs at one node, and the relative voltage at that node cannot be detected normally, a recovery voltage is calculated from the trend of the relative voltages detected at the nodes adjacent to that node (erroneous detection node), and the voltages of the battery modules are calculated by inference from the recovery voltage. That is, even when erroneous detection occurs at a node, the voltages of the two battery modules adjacent to that node can be calculated as voltages approximate to their actual voltages. Thus, with the above-described power supply apparatus according to the first aspect of the invention, the charging and discharging of the battery can be controlled while protection is effectively provided for the individual battery modules.

Moreover, since the recovery voltage is calculated based on the relative voltages detected at the two nodes adjacent to the erroneous detection node, any erroneously or abnormally detected relative voltage is easily corrected. Likewise, since the voltages of the battery modules are calculated based on those relative voltages that are judged to be normally detected voltages and the recovery voltage (which is a corrected relative voltage), the voltages of the battery modules are easily corrected.

Specifically, in the above-described power supply apparatus according to the first aspect of the invention, for example, the calculation circuit calculates the recovery voltage by calculating the mean value of the relative voltages detected at the two nodes.

Alternatively, in the above-described power supply apparatus according to the first aspect of the invention, for example, upon recognition of the erroneous detection node, the calculation circuit calculates the voltages of the battery modules by using the recovery voltage, and the voltage detection circuit feeds the electronic control unit with a detection failure signal indicating failure in the detection of the voltages of the battery modules.

Alternatively, in the above-described power supply apparatus according to the first aspect of the invention, for example, upon recognition of the erroneous detection node, the calculation circuit, by using the recovery voltage, calculates the voltage of one of the two battery modules connected to the erroneous detection node, and the voltage detection circuit notifies the electronic control unit of failure in the detection of the voltage of the other of the two battery modules.

To achieve the above object, according to a second aspect of the present invention, a power supply apparatus is provided with: a battery that is composed of n (where n is an integer equal to or greater than 2) battery modules connected in series; a voltage detection circuit that detects the voltages of the individual battery modules of the battery; and an electronic control unit that controls the charging and discharging of the battery based on the voltages of the individual battery modules as detected by the voltage detection circuit. Here, the voltage detection circuit is provided with: a voltage detector that detects the relative voltages between a predetermined reference node within the battery and each of the nodes between the battery modules connected in series; an erroneous detection checker that checks whether each of the relative voltages detected by the voltage detector is an erroneously detected voltage or a normally detected voltage; and a calculation circuit that calculates the voltages of the individual battery modules based on the relative voltages judged to be normally detected voltages. If consecutive C (where C is an integer equal to or greater than 2 and fulfilling $C \leq n-1$) of the nodes are recognized as erroneous detection nodes as a result of the corresponding relative voltages being judged to be erroneously detected voltages by the erroneous detection checker, the calculation circuit calculates, based on the relative voltages detected at the two nodes located adjacently on the positive and negative sides of the node group consisting of the C erroneous detection nodes, recovery voltages respectively for the C erroneous detection nodes, and then, by respectively replacing the relative voltages detected at the erroneous detection nodes with the recovery voltages, calculates the voltages of the battery modules.

With this circuit configuration, even when faults occur at consecutive nodes, and the relative voltages at those nodes cannot be detected normally, recovery voltages are calculated from the trend of the relative voltages detected at the nodes adjacent to those nodes (erroneous detection nodes), and the voltages of the battery modules are calculated by inference from the recovery voltages. That is, the voltages of the individual battery modules connected to those erroneous detection nodes can be calculated as voltages approximate to their actual voltages. Thus, with the above-described power supply apparatus according to the second aspect of the invention, the charging and discharging of the battery can be controlled while protection is effectively provided for the individual battery modules.

Moreover, since the individual recovery voltages are calculated based on the relative voltages detected at the two nodes adjacent to the node group consisting of the C erroneous detection nodes, any erroneously or abnormally detected relative voltages are easily corrected. Likewise, since the voltages of the battery modules are calculated based on those relative voltages that are judged to be normally detected voltages and the recovery voltages (which are corrected relative voltages), the voltages of the battery modules are easily corrected.

Specifically, in the above-described power supply apparatus according to the second aspect of the invention, for example, the calculation circuit calculates the recovery voltages respectively for the C erroneous detection nodes by dividing the relative voltages detected at the two nodes into equal parts.

Alternatively, in the above-described power supply apparatus according to the second aspect of the invention, for example, when the voltage between the relative voltages detected at the two nodes is divided into (C+1) equal parts with respect to the potential at the reference node, and the resulting C voltages are called, from the negative side, a first voltage, a second voltage, ..., a (C−1)th voltage, and a Cth voltage, the calculation circuit calculates the recovery voltages so that the recovery voltages calculated as corresponding respectively to the C erroneous detection nodes equal, from the negative side thereof, the first voltage, the second voltage, ..., the (C−1)th voltage, and the Cth voltage.

Alternatively, in the above-described power supply apparatus according to the second aspect of the invention, for example, upon recognition of the erroneous detection nodes, the calculation circuit calculates the voltages of the battery modules by using the recovery voltages, and the voltage detection circuit feeds the electronic control unit with a detection failure signal indicating failure in the detection of the voltages of the battery modules.

Alternatively, in the above-described power supply apparatus according to the first or second aspect of the invention, for example, of all the nodes between the battery modules connected in series, the node located in the middle is used as the reference node.

Alternatively, in the above-described power supply apparatus according to the first or second aspect of the invention, for example, the voltage detector includes a multiplexer of which the input side is connected to the individual nodes, and the relative voltages are detected one after another as a result of the nodes being connected one after another to the output side of the multiplexer.

To achieve the above object, according to a third aspect of the present invention, a power supply apparatus is provided with: a battery that is composed of n (where n is an integer equal to or greater than 2) battery modules connected in series; a voltage detection circuit that detects the voltages of the individual battery modules of the battery; and an electronic control unit that controls the charging and discharging of the battery based on the voltages of the individual battery modules as detected by the voltage detection circuit. Here, the voltage detection circuit is provided with: a voltage detector that detects the relative voltages between a predetermined reference node within the battery and each of the nodes between the battery modules connected in series; an erroneous detection checker that checks whether each of the relative voltages detected by the voltage detector is an erroneously detected voltage or a normally detected voltage; and a calculation circuit that calculates the voltages of the individual battery modules based on the relative voltages judged to be normally detected voltages. If one of the nodes is recognized as an erroneous detection node as a result of the corresponding relative voltage being judged to be an erroneously detected voltage by the erroneous detection checker, the calculation circuit calculates, based on the voltage difference between the relative voltages detected at the two nodes located adjacently on the positive and negative sides of the erroneous detection node, the voltages of the two battery modules adjacent to the erroneous detection node.

With this circuit configuration, even when a fault occurs at one node, and the relative voltage at that node cannot be detected normally, the voltages of the two battery modules adjacent to that node (erroneous detection node) are calculated from the trend of the relative voltages detected at the nodes adjacent to that node. That is, even when erroneous detection occurs at a node, the voltages of the two battery modules adjacent to that node can be calculated as voltages approximate to their actual voltages. Thus, with the above-described power supply apparatus according to the third aspect of the invention, the charging and discharging of the battery can be controlled while protection is effectively provided for the individual battery modules.

Specifically, in the above-described power supply apparatus according to the third aspect of the invention, for example, the calculation circuit calculates the voltages of the two battery modules by dividing the voltage difference into two equal parts.

To achieve the above object, according to a fourth aspect of the present invention, a power supply apparatus is provided with: a battery that is composed of n (where n is an integer equal to or greater than 2) battery modules connected in series; a voltage detection circuit that detects the voltages of the individual battery modules of the battery; and an electronic control unit that controls the charging and discharging of the battery based on the voltages of the individual battery modules as detected by the voltage detection circuit. Here, the voltage detection circuit is provided with: a voltage detector that detects the relative voltages between a predetermined reference node within the battery and each of nodes between the battery modules connected in series; an erroneous detection checker that checks whether each of the relative voltages detected by the voltage detector is an erroneously detected voltage or a normally detected voltage; and a calculation circuit that calculates the voltages of the individual battery modules based on the relative voltages judged to be normally detected voltages. If consecutive C (where C is an integer equal to or greater than 2 and fulfilling $C \leq n-1$) of the nodes are recognized as erroneous detection nodes as a result of the corresponding relative voltages being judged to be erroneously detected voltages by the erroneous detection checker, the calculation circuit calculates, based on the voltage difference between the relative voltages detected at the two nodes located adjacently on the positive and negative sides of the node group consisting of the C erroneous detection nodes, the voltages of a total of (C+1) battery modules adjacent to the erroneous detection nodes.

With this circuit configuration, even when faults occur at consecutive nodes, and the relative voltages at those nodes cannot be detected normally, the voltages of the battery modules are calculated by inference from the trend of the relative voltages detected at the nodes adjacent to those nodes (erroneous detection nodes). That is, the voltages of the individual battery modules connected to those erroneous detection nodes can be calculated as voltages approximate to their actual voltages. Thus, with the above-described power supply apparatus according to the fourth aspect of the invention, the charging and discharging of the battery can be controlled while protection is effectively provided for the individual battery modules.

Specifically, in the above-described power supply apparatus according to the fourth aspect of the invention, for example, the calculation circuit calculates the voltages of the (C+1) battery modules by dividing the voltage difference into equal parts.

Alternatively, in the above-described power supply apparatus according to the fourth aspect of the invention, for example, the calculation circuit calculates the voltage of each of the (C+1) battery modules as equal to the voltage difference divided into (C+1) equal parts.

DETAILED DESCRIPTION OF PREFERRED EMBODIMENTS

Hereinafter, power supply apparatuses embodying the present invention will be described with reference to the drawings. It should be understood, however, that the embodiments presented below are simply intended to give examples of power supply apparatuses that embody the technical idea of the present invention, and therefore the power supply apparatuses specifically described below are not intended to limit the present invention in any way.

A power supply apparatus embodying the invention is mounted on a vehicle (not illustrated) such as a hybrid car, electric car, or electrically-powered folk lift or on a vehicle or the like (not illustrated) that runs indoors to transport goods, and is used as an electric power source for driving the motor (not illustrated) for making the vehicle run. It should be understood, however, that a power supply apparatus embodying the invention may be used not only in a vehicle but also in an electric appliance of any kind.

Figure 1:
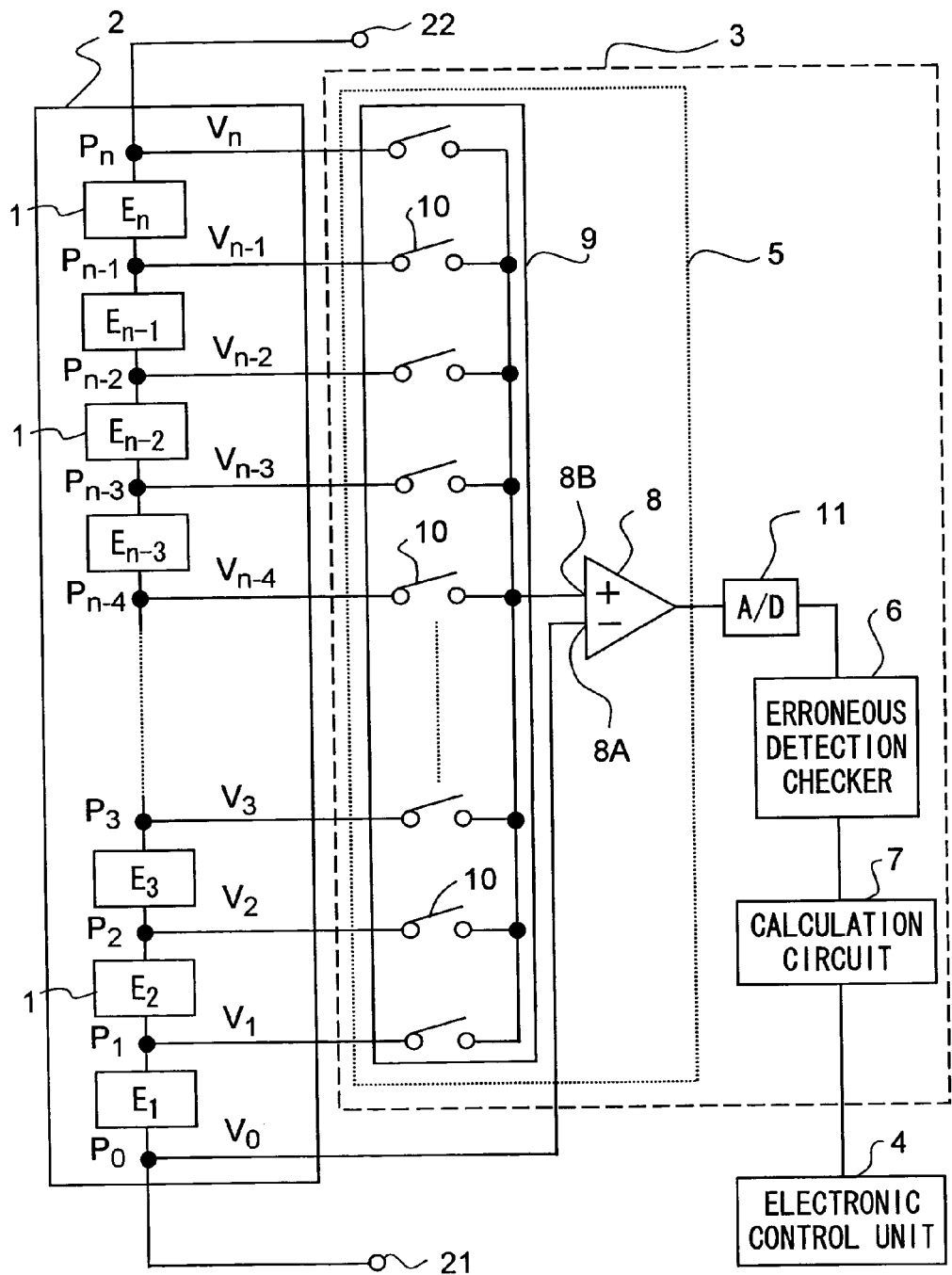
FIG. 1 is a circuit diagram of a power supply apparatus embodying the invention.

FIG. 1 is a circuit diagram of a power supply apparatus embodying the invention. The power supply apparatus shown in FIG. 1 is provided with: a vehicle-driving battery 2 that is composed of n (where n is an integer equal to or greater than 2) battery modules 1 connected in series; a voltage detection circuit 3 that detects the voltages of the individual battery modules 1 provided in the vehicle-driving battery 2; and an electronic control unit (ECU) 4 that controls the charging and discharging of the vehicle-driving battery 2 by checking the battery state thereof based on the voltages of the individual battery modules 1 as detected by the voltage detection circuit 3. Here, the battery state denotes the states of the individual battery modules 1 or the overall state of the battery modules 1 included in the vehicle-driving battery 2.

The vehicle-driving battery 2 is composed of, for example, 50 battery modules 1 connected in series. The vehicle-driving battery 2 may have less than 50 or more than 50 battery modules connected in series. The voltages of all the battery modules 1 are detected by the voltage detection circuit 3. The battery modules 1 are each composed of five secondary cells (for example, nickel hydride cells, not illustrated) connected in series.

The vehicle-driving battery 2 composed of 50 battery modules 1 connected in series is thus composed of a total of 250 secondary cells connected in series, yielding an output voltage of about 300 V. Each battery module 1 does not necessarily have to be composed of five secondary cells connected in series, but may be composed of, for example, four or less or six or more secondary cells connected in series. Each battery module 1 may even be composed of a single secondary cell. Usable as the secondary cells are any rechargeable cells such as lithium ion secondary cells and nickel cadmium cells.

Figure 2:
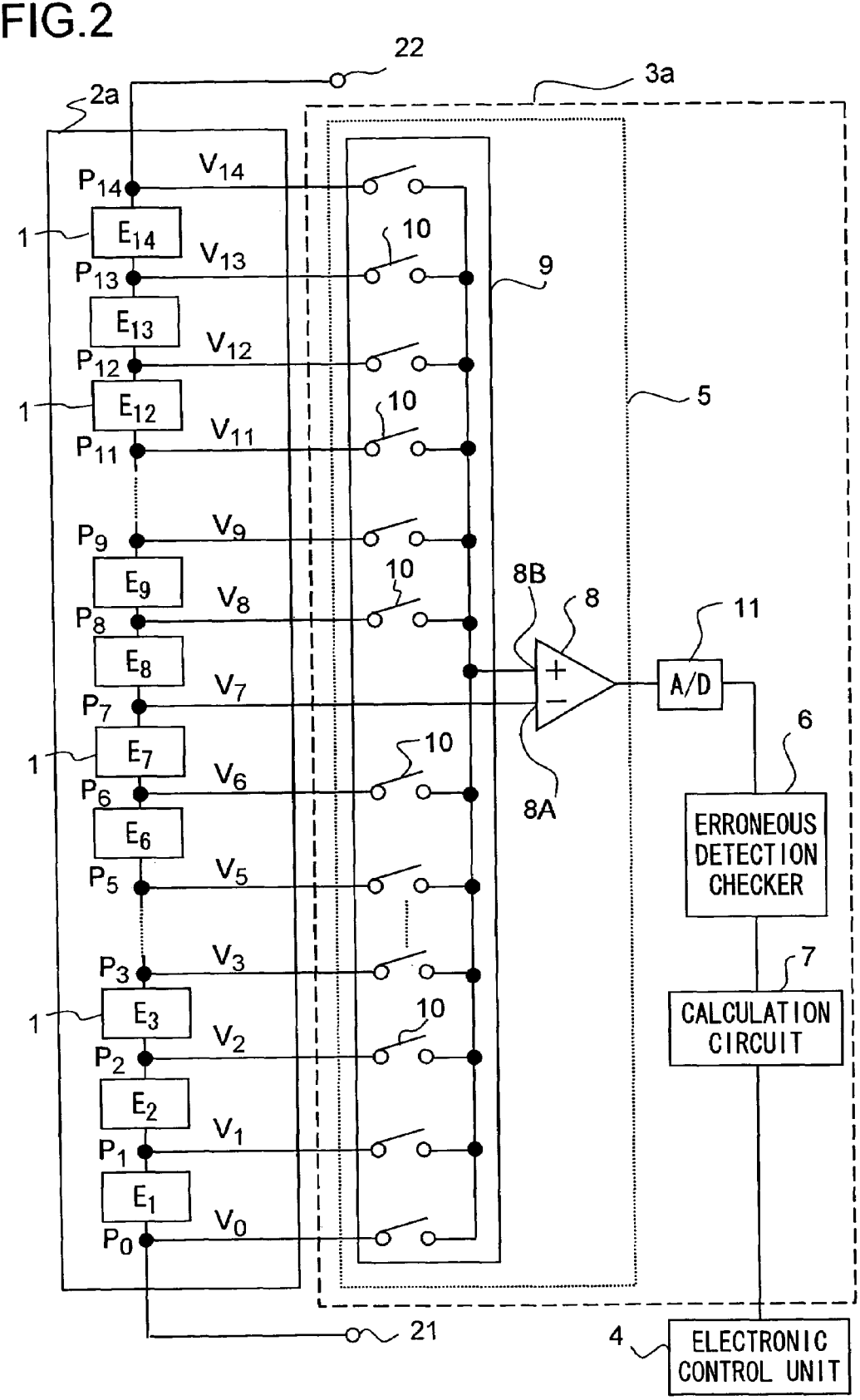
FIG. 2 is a circuit diagram showing a modified example of the power supply apparatus shown in FIG. 1.

In the power supply apparatus shown in FIG. 1, the node between the battery module 1 located at the lowest-voltage end of the vehicle-driving battery 2 and the negative-side output terminal 21 of the vehicle-driving battery 2 is identified by $P_0$, and the node between the battery module 1 located at the highest-voltage end of the vehicle-driving battery 2 and the positive-side output terminal 22 of the vehicle-driving battery 2 is identified by $P_n$. In order from $P_0$ to $P_n$, the nodes between the individual battery modules 1 are called the battery nodes $P_1, P_2, P_3, \ldots, P_{n-4}, P_{n-3}, P_{n-2}$, and $P_{n-1}$, respectively. Likewise, the node $P_n$ is called the battery node $P_n$, and the node $P_0$ is called the battery node $P_0$. In the power supply apparatus shown in FIG. 1, of all those battery nodes, the node $P_0$ is also specially called the reference node. It should be noted that, in the description of FIG. 2 given later, the node $P_0$ is often called simply the battery node $P_0$. Moreover, in the following description, the battery nodes $P_1, P_2, P_3, \ldots P_{n-4}, P_{n-3}, P_{n-2}, P_{n-1}$, and $P_n$ are collectively identified as the battery nodes $P_1$ to $P_n$.

The voltage detection circuit 3 is provided with: a voltage detector 5 that detects the relative voltages at the individual battery nodes; an erroneous detection checker 6 that checks, with one after another of the relative voltages detected by the voltage detector 5, whether they are each an erroneously detected voltage or a normally detected voltage; and a calculation circuit 7 that calculates the voltages of the individual battery modules 1 based on the relative voltages detected.

The voltage detector 5 detects, one after another, the relative voltages at the battery nodes $P_1$ to $P_n$ relative to the reference node $P_0$. The voltage detector 5 includes: a multiplexer 9 whose input side is connected to the battery nodes $P_1, P_2, \ldots, P_{n-1}$, and $P_n$; and a differential amplifier 8 that detects the relative voltages. The multiplexer 9 includes n switching devices 10, the input terminal of each of which is connected to a different one of the battery nodes $P_1$ to $P_n$. The output terminals of all the switching devices 10 are connected together, and are then connected to the output terminal (output side) of the multiplexer 9.

The first input terminal 8A (for example, the inverting input terminal) of the differential amplifier 8 is connected to the reference node $P_0$. The second input terminal 8B (for example, the non-inverting input terminal) of the differential amplifier 8 is connected to the output terminal of the multiplexer 9. That is, the second input terminal 8B of the differential amplifier 8 is connected via the multiplexer 9 to each of the battery nodes $P_1$ to $P_n$. The multiplexer 9 turns on the switching devices 10 one after another at predetermined time intervals so that one after another of the battery nodes $P_1$ to $P_n$ is connected to the second input terminal 8B of the differential amplifier 8. Thus, the differential amplifier 8 detects one after another of the relative voltages at the battery nodes $P_1$ to $P_n$ relative to the reference node $P_0$.

The relative voltages at the battery nodes $P_1, P_2, P_3, \ldots, P_{n-4}, P_{n-3}, P_{n-2}, P_{n-1}$, and $P_n$ as detected by the voltage detector 5 are represented by $V_1, V_2, V_3, \ldots, V_{n-4}, V_{n-3}, V_{n-2}, V_{n-1}$ and $V_n$ respectively. Moreover, in the following description, the relative voltages $V_1, V_2, V_3, \ldots, V_{n-4}, V_{n-3}, V_{n-2}, V_{n-1}$ and $V_n$ are collectively identified as the relative voltages $V_1$ to $V_n$. Needless to say, the relative voltage $V_0$ at the reference node $P_0$ is 0 V.

Moreover, the voltage of the battery module 1 connected directly between the reference node $P_0$ and the battery node $P_1$, the voltage of the battery module 1 connected directly between the battery node $P_1$ and the battery node $P_2$, the voltage of the battery module 1 connected directly between the battery node $P_2$ and the battery node $P_3, \ldots$, the voltage of the battery module 1 connected directly between the battery node $P_{n-4}$ and the battery node $P_{n-3}$, the voltage of the battery module 1 connected directly between the battery node $P_{n-3}$ and the battery node $P_{n-2}$, the voltage of the battery module 1 connected directly between the battery node $P_{n-2}$ and the battery node $P_{n-1}$, and the voltage of the battery module 1 connected directly between the battery node $P_{n-1}$ and the battery node $P_n$ are called the battery module voltages $E_1, E_2, E_3, \ldots, E_{n-3}, E_{n-2}, E_{n-1}$, and $E_n$, respectively. Moreover, in the following description, the battery module voltages $E_1, E_2, E_3, \ldots, E_{n-3}, E_{n-2}, E_{n-1}$, and $E_n$ are collectively identified as the battery module voltages $E_1$ to $E_n$.

The output side of the differential amplifier 8 is connected to an A/D converter 11. The A/D converter 11 converts the relative voltages $V_1$ to $V_n$, outputted in the form of an analog signal from the differential amplifier 8, into relative voltages in the form of a digital signal. The relative voltages thus converted by the A/D converter 11 into a digital signal are then fed to the erroneous detection checker 6. In a case where the output of the differential amplifier 8 is converted into a digital signal by the A/D converter 11 in this way, the erroneous detection checker 6 digitally processes the digital signal to check for any erroneously detected voltages, and the calculation circuit 7 also digitally processes the results of the checking to calculate the voltages of the individual battery modules 1. The erroneous detection checker 6 does not necessarily have to perform the checking for erroneously detected voltages through digital processing, but may perform it through analog processing. Thus, the output of the differential amplifier 8 may be fed directly, i.e., without being fed via the A/D converter 11, to the erroneous detection checker 6 (not illustrated).

While the voltage detector 5 detects the relative voltages $V_1$ to $V_n$ one after another, the erroneous detection checker 6 checks, with one after another of those relative voltages $V_1$ to $V_n$, whether they are each a normally detected voltage or an erroneously detected voltage. To check whether each detected relative voltage is a normally detected voltage or an erroneously detected voltage, the erroneous detection checker 6 refers to the lowest and highest battery module voltages $V_L$ and $V_H$ stored in an unillustrated memory. Here, the lowest battery module voltage $V_L$ is, for example, the lowest voltage expected (or permitted) across each battery module 1, and the highest battery module voltage $V_H$ is, for example, the highest voltage expected (or permitted) across each battery module 1.

For example, assume that the switching devices 10 are switched sequentially so that, in order from the battery node $P_1$ to the battery node $P_n$, one battery node after another is connected to the second input terminal 8B of the differential amplifier 8. In this case, the relative voltages detected by the differential amplifier 8 one after another are each equal to the voltage of one battery module 1 more than the relative voltage detected last time. In other words, the relative voltage detected this time is equal to the voltage of one battery module 1 less than the relative voltage detected next time. If the relative voltages detected are normal (or regarded as normal), the voltage of the one battery module 1 of interest should be within the range demarcated by the lowest and highest voltages $V_L$ and $V_H$.

Accordingly, if the relative voltage detected at a given time is within the range calculated by adding the range of the voltage of one battery module 1 to the relative voltage detected last time, the relative voltage detected this time is judged to be a normally detected voltage, and otherwise it is judged to be an erroneously detected voltage. Specifically, for example, if the inequality (the lowest battery module voltage $V_L$)$\leq$($V_2-V_1$)$\leq$(the highest battery module voltage $V_H$) holds, the detected relative voltage $V_2$ is judged to be a normally detected voltage, and, if the inequality does not hold, the detected relative voltage $V_2$ is judged to be an erroneously detected voltage. Likewise, if the inequality (the lowest battery module voltage $V_L$)$\leq$($V_3-V_2$)$\leq$(the highest battery module voltage $V_H$) holds, the detected relative voltage $V_3$ is judged to be a normally detected voltage, and, if the inequality does not hold, the detected relative voltage $V_3$ is judged to be an erroneously detected voltage. In the two inequalities noted above, the symbols "$\leq$" may be replaced with the symbols "<".

Alternatively, if the relative voltage detected at a given time is within the range calculated by subtracting the range of the voltage of one battery module 1 from the relative voltage detected next time, the relative voltage detected this time is judged to be a normally detected voltage, and otherwise it is judged to be an erroneously detected voltage. Specifically, for example, if the inequality (the lowest battery module voltage $V_L$)$\leq$($V_2-V_1$)$\leq$(the highest battery module voltage $V_H$) holds, the detected relative voltage $V_1$ is judged to be a normally detected voltage, and, if the inequality does not hold, the detected relative voltage $V_1$ is judged to be an erroneously detected voltage. Likewise, if the inequality (the lowest battery module voltage $V_L$)$\leq$($V_3-V_2$)$\leq$(the highest battery module voltage $V_H$) holds, the detected relative voltage $V_2$ is judged to be a normally detected voltage, and, if the inequality does not hold, the detected relative voltage $V_2$ is judged to be an erroneously detected voltage. In the two inequalities noted above, the symbols "$\leq$" may be replaced with the symbols "<".

For example, suppose that the lead (detection line) connecting the battery node $P_{n-2}$ to the input side of the multiplexer 9 is broken (or an unillustrated connector present on the way along that lead suffers bad contact). In this case, the battery node $P_{n-2}$ is no longer connected to the input side of the multiplexer 9, and thus the detected relative voltage $V_{n-2}$ falls below the normal range (within which it would be judged as a normally detected voltage), and is judged to be an erroneously detected voltage. Normally, the relative voltage $V_{n-2}$ detected at the battery node $P_{n-2}$ should be equal to the voltage of the battery module voltage $E_{n-2}$ more than the relative voltage $V_{n-3}$ detected at the battery node $P_{n-3}$. Ordinarily, the battery module voltage $E_{n-2}$ is within the range between the lowest and highest voltages $V_L$ and $V_H$.

Thus, the normal range of the relative voltage $V_{n-2}$ detected at the battery node $P_{n-2}$ is, for example, from (the detected $V_{n-3}$)+(the lowest voltage of the battery module voltage $E_{n-2}$) to (the detected $V_{n-3}$)+(the highest voltage of the battery module voltage $E_{n-2}$), both ends inclusive. When line breakage as described above or another fault occurs, the relative voltage $V_{n-2}$ detected at the battery node $P_{n-2}$ goes out of the normal range, and thus the detected relative voltage $V_{n-2}$ is judged to be an erroneously detected voltage (if within that range, it is judged to be a normally detected voltage).

Alternatively, the range within which the relative voltage $V_{n-2}$ detected at the battery node $P_{n-2}$ is judged to be a normally detected voltage may be demarcated by the relative voltage $V_{n-1}$ detected at the battery node $P_{n-1}$. In this case, the normal range of the relative voltage $V_{n-2}$ is the battery module voltage $E_{n-1}$ less than the relative voltage $V_{n-1}$. Since the battery module voltage $E_{n-1}$ is within the range between the lowest and highest voltages $V_L$ and $V_H$, the normal range of the relative voltage $V_{n-2}$ detected at the battery node $P_{n-2}$ is, for example, from (the detected $V_{n-1}$)−(the highest voltage of the battery module voltage $E_{n-1}$) to (the detected $V_{n-1}$)−(the lowest voltage of the battery module voltage $E_{n-1}$), both ends inclusive. If the detected relative voltage $V_{n-2}$ is within this normal range, it is judged to be a normally detected voltage, and otherwise it is judged to be an erroneously detected voltage.

Alternatively, the inequality (q×the lowest voltage $V_L$)$\leq$the detected relative voltage $V_q$$\leq$(q×the highest voltage $V_H$) may be used (where q is an arbitrary integer from 1 to n) so that, if the inequality holds, the detected relative voltage $V_q$ is judged to be a normally detected voltage and, if not, the detected relative voltage $V_q$ is judged to be an erroneously detected voltage. In this inequality, the symbols "$\leq$" may be replaced with the symbols "<". In particular, if the detected relative voltage $V_q$ is judged to be an erroneously detected voltage as a result of its being lower than the lowest voltage, a fault such as line breakage in a detection line or bad contact in a detection line in the detection circuit is very likely.

In the following description, q represents an arbitrary integer from 1 to (n−1) unless otherwise specified (that is, q never equals to n).

When the detected relative voltage $V_q$ is judged to be an erroneously detected voltage, the calculation circuit 7 calculates the recovery voltage $VR_q$ for the battery node $P_q$ at which the erroneously detected voltage is being detected. The subscript "q" in the symbols representing the relative voltage $V_q$, the battery node $P_q$, and the recovery voltage $VR_q$ represents, as described above, an arbitrary integer from 1 to (n−1). For example, if the relative voltage $V_1$ is judged to be an erroneously detected voltage, the recovery voltage $VR_1$ for the battery node $P_1$ is calculated.

In the following description, a "relative voltage detected by the voltage detector 5 and judged to be an erroneously detected voltage by the erroneous detection checker 6" is referred to simply as an "erroneously detected relative voltage". The recovery voltage $VR_q$ is, as it were, an "inferred" relative voltage at the battery node $P_q$, and the calculation circuit 7 replaces the erroneously detected relative voltage $V_q$ with the recovery voltage $VR_q$ when calculating the battery module voltages $E_1$ to $E_n$. In other words, the calculation circuit 7 regards the recovery voltage $VR_q$ as the detected relative voltage $V_q$ when calculating the battery module voltages $E_1$ to $E_n$. More specifically, the calculation circuit 7 replaces the erroneously detected relative voltage $V_q$ with the recovery voltage $VR_q$, and calculates the battery module voltages $E_q$ and $E_{q+1}$. Alternatively, the calculation circuit 7 replaces the erroneously detected relative voltage $V_q$ with the recovery voltage $VR_q$, and calculates one of the battery module voltages $E_q$ and $E_{q+1}$.

The recovery voltage is calculated by dividing into equal parts the normally detected voltages (relative voltages judged to be normally detected voltages) detected at the two battery nodes located adjacently on the positive and negative sides of the battery node at which an erroneously detected voltage is being detected. The calculation circuit 7 then calculates the voltages of the battery modules 1 by using, as the relative voltage at that battery node, the thus calculated recovery voltage instead of the erroneously detected voltage.

For example, if the relative voltage $V_{n-2}$ detected at one battery node $P_{n-2}$ is judged to be an erroneously detected voltage, the calculation circuit 7 calculates the recovery voltage $VR_{n-2}$ for the battery node $P_{n-2}$ by calculating the arithmetic mean of the relative voltage $V_{n-1}$ detected at the battery node $P_{n-1}$, which is located adjacently on the positive side of the battery node $P_{n-2}$, and the relative voltage $V_{n-3}$ detected at the battery node $P_{n-3}$, which is located adjacently on the negative side of the battery node $P_{n-2}$, and then, by using the thus calculated recovery voltage $VR_{n-2}$, calculates the battery module voltages $E_{n-1}$ and $E_{n-2}$. That is, with the erroneously detected relative voltage $V_{n-2}$ replaced with the recovery voltage $VR_{n-2}$, the battery module voltages $E_{n-1}$ and $E_{n-2}$ are calculated. The recovery voltage $VR_{n-2}$ calculated as an arithmetic mean is calculated by formula (1) below. Here, it is assumed that the relative voltages $V_{n-1}$ and $V_{n-3}$ are judged to be normally detected voltages.

$$VR_{n-2}=(V_{n-1}+V_{n-3})/2 \tag{1}$$

If the relative voltage $V_q$ detected at an arbitrary battery node $P_q$ is judged to be an erroneously detected voltage, the corresponding recovery voltage $VR_q$, is calculated by formula (2) below.

$$VR_q=(V_{q+1}+V_{q-1})/2 \tag{2}$$

Formula (2) noted above can be rearranged into formula (3) below. That is, the recovery voltage $VR_q$ is calculated as the sum of the "relative voltage $V_{q-1}$ at the battery node $P_{q-1}$ located adjacently on the negative side of the battery node $P_q$ at which the detected relative voltage $V_q$ is being judged to be an erroneously detected voltage" and the "value obtained by dividing into two equal parts the voltage difference between the relative voltages $V_{q+1}$ and $V_{q-1}$ detected at the two battery nodes $P_{q+1}+P_{q-1}$ located adjacently on the positive and negative sides of the battery node $P_q$". Alternatively, formula (2) noted above can be rearranged into formula (4) below. That is, the recovery voltage $VR_q$ is calculated as the value obtained by subtracting the "value obtained by dividing into two equal parts the voltage difference between the relative voltages $V_{q+1}$ and $V_{q-1}$ detected at the two battery nodes $P_{q+1}$ and $P_{q-1}$ located adjacently on the positive and negative sides of the battery node $P_q$" from the "relative voltage $V_{q+1}$ at the battery node $P_{q+1}$ located adjacently on the positive side of the battery node $P_q$ at which the detected relative voltage $V_q$ is being judged to be an erroneously detected voltage".

$$VR_q=V_{q-1}+(V_{q+1}-V_{q-1})/2 \tag{3}$$

$$VR_q=V_{q+1}-(V_{q+1}-V_{q-1})/2 \tag{4}$$

Whichever of formulae (2), (3), and (4) noted above may be used, the recovery voltage $VR_q$ is equal to the mean value of $V_{q+1}$ and $V_{q-1}$. That is, the calculation circuit 7 calculates the recovery voltage $VR_q$ so that it equals the mean value of $V_{q+1}$ and $V_{q-1}$. In calculating the recovery voltage $VR_q$ according to any of formulae (2), (3), and (4) noted above, it is assumed that the relative voltages $V_{q+1}$ and $V_{q-1}$ are being judged to be normally detected voltages.

When the erroneous detection checker 6 recognizes an erroneously detected voltage, the voltage detection circuit 3 (more specifically, for example, the erroneous detection checker 6 or the calculation circuit 7) outputs to the electronic control unit 4 a detection failure signal indicating failure of normal detection of a battery module voltage. For example, every time an erroneously detected voltage is detected, one detection failure signal is outputted. The power supply apparatus calculates the individual battery module voltages based on the differences between the relative voltages at the individual battery nodes. Thus, if an erroneously detected voltage is detected at any of the battery nodes, it may become impossible to detect the voltages of the two battery modules 1 connected on the positive and negative sides of that battery node. In the power supply apparatus shown in FIG. 1, however, the relative voltage at the battery node at which an erroneously detected voltage is being detected is replaced with a recovery voltage, and this makes it possible to calculate the voltages of the two battery modules 1 connected to the battery node at which erroneous detection is recognized.

When an erroneously detected voltage is detected, the voltage detection circuit 3, by using the recovery voltage, calculates the voltages of the two battery modules 1 connected directly to the battery node at which erroneous detection is being recognized, and in addition outputs the above-mentioned detection failure signal to the electronic control unit 4. The voltage detection circuit 3 also outputs to the electronic control unit 4, along with the detection failure signal, a signal that identifies the battery node at which the relative voltage is not being normally detected or a signal that identifies the battery modules 1 of which the battery module voltages cannot be detected due to the corresponding relative voltage being judged to be an erroneously detected voltage.

For example, consider a case where the detected relative voltages $V_{n-1}$ and $V_{n-3}$ are judged to be normally detected voltages and the detected relative voltages $V_{n-2}$ is judged to be an erroneously detected voltage. In this case, the calculation circuit 7, by using one of formulae (2), (3), and (4) noted above or any other formula, calculates the recovery voltage $VR_{n-2}$, and in addition the erroneous detection checker 6 or the calculation circuit 7 outputs to the electronic control unit 4, along with the detection failure signal, a "signal that indicates that the battery node at which the relative voltage is not being normally detected is the battery node $P_{n-2}$" or a "signal that indicates that the battery modules 1 of which the battery module voltages cannot be detected based on the detected relative voltage $V_{n-2}$ are the two battery modules 1 connected directly to the battery node $P_{n-2}$".

Instead of the above-described procedure, the following procedure may be used. Through this substitute procedure, the calculation circuit 7 calculates, based on the recovery voltage, the voltage of one of the two battery modules 1 connected directly to the battery node at which an erroneously detected voltage is being detected, and the voltage detection circuit 3 (more specifically, for example, the erroneous detection checker 6 or the calculation circuit 7) notifies the electronic control unit 4 that the voltage of the other battery module 1 cannot be normally detected. Thereafter, the electronic control unit 4 or an unillustrated separate processor or the like that is provided in the stage following the electronic control unit 4 determines the voltage of the other battery module 1 as equal to the voltage of the one battery module 1 as calculated based on the recovery voltage.

For example, consider a case where the detected relative voltages $V_{n-1}$ and $V_{n-3}$ are judged to be normally detected voltages and the detected relative voltages $V_{n-2}$ is judged to be an erroneously detected voltage. In this case, the calculation circuit 7, by using one of formulae (2), (3), and (4) noted above or any other formula, calculates the recovery voltage $VR_{n-2}$, and calculates, according to the formula $E_{n-1} = V_{n-1} - VR_{n-2}$, the battery module voltage $E_{n-1}$ of the battery module 1 connected to the positive side of the battery node $P_{n-2}$ at which the erroneously detected voltage is being detected. Then, the voltage detection circuit 3 (more specifically, for example, the erroneous detection checker 6 or the calculation circuit 7) notifies the electronic control unit 4 that the battery module voltage $E_{n-2}$ of the battery module 1 connected to the negative side of the battery node $P_{n-2}$ at which the erroneously detected voltage is being detected cannot be normally detected. Thereafter, the electronic control unit 4 or a an unillustrated separate processor or the like that is provided in the stage following the electronic control unit 4 determines the battery module voltage $E_{n-2}$ as equal to the battery module voltage $E_{n-1}$.

Incidentally the voltage detection circuit 3 calculates, based on the recovery voltage, the voltages of the battery modules 1 connected to the battery node at which the erroneously detected voltage is being detected, and outputs to the electronic control unit 4 the calculated voltages of the battery modules 1 and a detection failure signal alternately.

Based on the detection failure signal fed from the voltage detection circuit 3, the electronic control unit 4 controls the charging and discharging of the vehicle-driving battery 2. For example, so long as the number of detection failure signals is small, the charge or discharge current of the vehicle-driving battery 2 is not restricted; when the number of detection failure signals exceeds a first set number, the charge or discharge current is restricted. When the number of detection failure signals further increases and exceeds a second set number (greater than the first set number), the charge or discharge current of the vehicle-driving battery 2 is cut.

In communication commands for handling the digital signals transmitted from the voltage detection circuit 3 to the electronic control unit 4, for example in a case where the voltages of the battery modules are detected with a 14-bit A/D converter and the 14-bit digital signals representing the detected voltages are transmitted in the form of 2-byte 8-bit signals, these digital signals can be transmitted by a protocol that handles, in each byte, seven bits as voltage signals and the remaining one as an identification bit. In this case, transmitting the first one bit as an identification bit permits the receiving side to identify the transmitted signal with the first one bit thereof.

In the power supply apparatus shown in FIG. 1 (and also the power supply apparatus shown in FIG. 2), even when erroneously detected voltages are detected at C (where C is an integer equal to or greater than 2) consecutive battery nodes, the voltages of the individual battery modules 1 can be calculated. This is achieved on the following principle. When the erroneous detection checker 6 detects erroneously detected voltages, the calculation circuit 7 calculates recovery voltages by dividing into equal parts the relative voltages detected at the battery nodes located adjacently on the positive and negative sides of the battery nodes at which the erroneously detected voltages are being detected, and calculates the voltages of the battery modules 1 with the erroneously detected relative voltages replaced with the thus calculated recovery voltages.

For example, if the relative voltages $V_{n-2}$ and $V_{n-3}$ detected at two mutually adjacent battery nodes $P_{n-2}$ and $P_{n-3}$ are both judged to be erroneously detected voltages, the calculation circuit 7 calculates, as relative voltages $V_{n-2}$ and $V_{n-3}$ at those two nodes, recovery voltages $VR_{n-2}$ and $VR_{n-3}$, respectively. The recovery voltages $VR_{n-2}$ and $VR_{n-3}$ are calculated by dividing into three equal parts the relative voltages $V_{n-1}$ and $V_{n-4}$ at the battery nodes $P_{n-1}$ and $P_{n-4}$ located adjacently on the positive and negative sides, respectively, of the two battery nodes $P_{n-2}$ and $P_{n-3}$ at which the erroneously detected voltages are being detected. The recovery voltages $VR_{n-2}$ and $VR_{n-3}$ at the two battery nodes $P_{n-2}$ and $P_{n-3}$ are calculated through three-part division, specifically according to the formulae below. Here, it is assumed that the relative voltages $V_{n-1}$ and $V_{n-4}$ are normally detected voltages.

$$VR_{n-2} = V_{n-4} + 2(V_{n-1} - V_{n-4})/3$$

$$VR_{n-3} = V_{n-4} + (V_{n-1} - V_{n-4})/3$$

If the relative voltages $V_q, V_{q+1}, \ldots, V_{q+C-2}$, and $V_{q+C-1}$ detected at C mutually adjacent, i.e., consecutive, battery nodes $P_q, P_{q+1}, \ldots, P_{q+C-2}$, and $P_{q+C-1}$ are all judged to be erroneously detected voltages, the calculation circuit 7 calculates the recovery voltages $VR_q, VR_{q+1}, \ldots, VR_{q+C-2}$, and $VR_{q+C-1}$ according to formula (5) below, which consists of C equations.

$$\left. \begin{aligned} VR_q &= V_{q-1} + (V_{q+C} - V_{q-1})/(C+1) \\ VR_{q+1} &= VR_q + (V_{q+C} - V_{q-1})/(C+1) \\ &\vdots \\ VR_{q+C-2} &= VR_{q+C-3} + (V_{q+C} - V_{q-1})/(C+1) \\ VR_{q+C-1} &= VR_{q+C-2} + (V_{q+C} - V_{q-1})/(C+1) \end{aligned} \right\} \quad (5)$$

That is, the voltage difference between the relative voltages $V_{q-1}$ and $V_{q+C}$ detected at the two battery nodes $P_{q-1}$ and $P_{q+C}$ located adjacent to the node group of C battery nodes $P_q$ to $P_{q+C-1}$ is divided into (C+1) equal parts with respect to the potential at the reference node $P_0$, and the C voltages obtained as the result of the (C+1) division are used as, in order from the negative side, the recovery voltages $VR_q, VR_{q+1}, \ldots,$ $VR_{q+C-2}$, and $VR_{q+C-1}$. Here, it is assumed that the relative voltages $V_{q-1}$ and $V_{q+C}$ are normally detected voltages, and that the inequality $q+C \leq n$ holds. Incidentally, when $q=1$, the relative voltage $V_{q-1}$ is equal to the relative voltage $V_0$ (i.e., 0 V).

The calculation circuit 7 then replaces the erroneously detected relative voltages $V_q, V_{q+1}, \ldots, V_{q+C-2}$, and $V_{q+C-1}$ with the recovery voltages $VR_q, VR_{q+1}, \ldots, VR_{q+C-2}$, and $VR_{q+C-1}$, respectively, and calculates the battery module voltages $E_1$ to $E_n$. In other words, the calculation circuit 7 regards the recovery voltages $VR_q, VR_{q+1}, \ldots, VR_{q+C-2}$, and $VR_{q+C-1}$ as the detected relative voltages $V_q, V_{q+1}, \ldots, V_{q+C-2}$, and $V_{q+C-1}$ in calculating the battery module voltages $E_1$ to $E_n$. More specifically, calculation circuit 7 replaces the erroneously detected relative voltages $V_q, V_{q+1}, \ldots, V_{q+C-2}$, and $V_{q+C-1}$ with the recovery voltages $VR_q, VR_{q+1}, \ldots, VR_{q+C-2}$, and $VR_{q+C-1}$, respectively, and calculates the battery module voltages $E_q, E_{q+1}, \ldots, E_{q+C-1}$, and $E_{q+C}$.

Also when the relative voltages detected at C consecutive battery nodes are all judged to be erroneously detected voltages, the voltage detection circuit 3 outputs to the electronic control unit 4 a detection failure signal that indicates failure of normal detection of battery module voltages. For example, every time an erroneously detected voltage is detected, one detection failure signal is outputted. In this case, the voltage detection circuit 3 calculates, by using recovery voltages (for example, $VR_{n-2}$ and $VR_{n-3}$), the battery module voltages (for example, $E_{n-1}, E_{n-2}$, and $E_{n-3}$) of all the battery modules connected directly to the individual battery nodes (for example, $P_{n-2}$ and $P_{n-3}$) at which erroneously detected voltages are being detected, and outputs to the electronic control unit 4, along with the detection failure signals, the thus calculated battery module voltages. Here, the voltage detection circuit 3 also outputs to the electronic control unit 4, along with the detection failure signals, a signal that identifies the battery nodes at which the relative voltages are not being normally detected or a signal that identifies the battery modules 1 of which the battery module voltages cannot be detected due to the corresponding relative voltages being judged to be erroneously detected voltages. Incidentally the voltage detection circuit 3 calculates, based on the recovery voltages, the voltages of the battery modules 1 connected to the battery nodes at which the erroneously detected voltages are being detected, and outputs to the electronic control unit 4 the calculated voltages of the battery modules 1 and detection failure signals alternately.

Instead of the above-described procedure, the following procedure may be used. The following description of the substitute procedure assumes that the relative voltages detected at two consecutive battery nodes $P_{n-2}$ and $P_{n-3}$ are being judged to be erroneously detected voltages. Through this procedure, the calculation circuit 7 calculates, based on the recovery voltage $VR_{n-3}$, the battery module voltage $E_{n-3}$, and the voltage detection circuit 3 (more specifically, for example, the erroneous detection checker 6 or the calculation circuit 7) notifies the electronic control unit 4 that the battery module voltages $E_{n-2}$ and $E_{n-1}$ cannot be normally detected. Thereafter, the electronic control unit 4 or an unillustrated separate processor or the like that is provided in the stage following the electronic control unit 4 determines the battery module voltages $E_{n-2}$ and $E_{n-1}$ as equal to the battery module voltage $E_{n-3}$ as calculated based on the recovery voltage $VR_{n-3}$.

Also in this case, based on the detection failure signals fed from the voltage detection circuit 3, the electronic control unit 4 controls the charging and discharging of the vehicle-driving battery 2. For example, so long as the number of detection failure signals is small, the charge or discharge current of the vehicle-driving battery 2 is not restricted; when the number of detection failure signals exceeds a first set number, the charge or discharge current is restricted. When the number of detection failure signals further increases and exceeds a second set number (greater than the first set number), the charge or discharge current of the vehicle-driving battery 2 is cut.

The calculation circuit 7 provided in the voltage detection circuit 3 calculates the individual battery module voltages $E_1$ to $E_n$ based on the individual relative voltages $V_1$ to $V_n$ detected. The battery module voltages $E_1$ to $E_n$ are equal to the voltage differences between mutually adjacent battery nodes, and are thus calculated according to formula (6) below, which consists of n equations. When all the relative voltages $V_1$ to $V_n$ are judged to be normally detected voltages by the erroneous detection checker 6, the battery module voltages $E_1$ to $E_n$ are calculated solely based on the detected relative voltages $V_1$ to $V_n$. However, if a relative voltage $V_q$ is judged to be an erroneously detected voltage, as described above, this erroneously detected relative voltage $V_q$ is replaced with a recovery voltage $VR_q$, and then the individual battery module voltages $E_1$ to $E_n$ are calculated (as noted earlier, q is an arbitrary integer from 1 to (n−1)).

$$\left.\begin{array}{l} E_1 = V_1 \\ E_2 = V_2 - V_1 \\ E_3 = V_3 - V_2 \\ \vdots \\ E_{n-1} = V_{n-1} - V_{n-2} \\ E_n = V_n - V_{n-1} \end{array}\right\} \quad (6)$$

When the relative voltage $V_q$ at an arbitrary battery node $P_q$ is judged to be an erroneously detected voltage, the recovery voltage $VR_q$ is calculated according to formula (2) etc. as noted earlier. In this case, the battery module voltage $E_q$ is given by formula (7) below.

$$E_q = VR_q - V_{q-1} \quad (7)$$

By substituting formula (2) in formula (7), formula (7) can be rearranged into formula (8) below.

$$E_q = (V_{q+1} - V_{q-1})/2 \quad (8)$$

That is, when what needs to be known is the battery module voltage $E_q$, it can be calculated according to formula (8) without calculating the recovery voltage $VR_q$ corresponding to the battery node $P_q$ at which an erroneously detected voltage is being detected. In this case, as will be understood from formula (8), the battery module voltage $E_q$ is calculated by dividing into two equal parts the difference between the relative voltages at the two battery nodes adjacent to the battery node $P_q$ at which the erroneously detected voltage is being detected. Then, the battery module voltage $E_{q+1}$ of the battery modules 1 adjacent to the battery node $P_q$ at which the erroneously detected voltage is being detected is determined as equal to $E_q$, that is $E_q = E_{q+1}$.

If the relative voltages detected at C consecutive battery nodes $P_q, P_{q+1}, \ldots, P_{q+C-2}$, and $P_{q+C-1}$ are all judged to be erroneously detected voltages, the $E_q, E_{q+1}, \ldots, E_{q+C-1}$, and $E_{q+C}$ are calculated according to formula (9) below. Here, it is assumed that the relative voltages $V_{q-1}$ and $V_{q+C}$ are normally detected voltages, and that the inequality $q+C \leq n$ holds.

$$E_{q+C} = E_{q+C-1} = \ldots = E_{q+1} = E_q = (V_{q+C} - V_{q-1})/(C+1) \quad (9)$$

That is, based on the voltage difference between the relative voltages $V_{q-1}$ and $V_{q+C}$ detected at the two battery nodes $P_{q-1}$ and $P_{q+C}$ located adjacently on the positive and negative sides of the node group consisting of C consecutive battery nodes $P_q$ to $P_{q+C-1}$, the individual voltages (i.e., the battery module voltage $E_q$ to $E_{q+C}$) of a total of (C+1) battery modules 1 that are adjacent to the individual battery nodes $P_q$ to $P_{q+C-1}$ are calculated.

The battery module voltages $E_1$ to $E_n$ calculated according to formula (6), (8), or (9) noted above are transmitted from the voltage detection circuit 3 (more specifically, the calculation circuit 7) to the electronic control unit 4. Based on the battery module voltages $E_1$ to $E_n$, the electronic control unit 4 calculates the amounts of electricity remaining in the individual battery modules 1. Here, the calculated amount of remaining electricity may be corrected based on the charge or discharge current of the vehicle-driving battery 2. When the voltage of one battery module 1 or the voltages of two or more battery modules 1 drops to the lowest voltage $V_L$, while charging is permitted, discharging is inhibited; on the other hand, when the voltage of one battery module 1 or the voltages of two or more battery modules 1 rises to the highest voltage $V_H$, while discharging is permitted, charging is inhibited.

The above description deals with, as a typical example of the method for detecting the individual relative voltages $V_1$ to $V_n$, a method whereby "the switching devices 10 are turned on one after another so that, in order from the battery node $P_1$ to the battery node $P_n$, one after another of the battery nodes is connected to the second input terminal 8B of the differential amplifier 8." The order in which the relative voltages $V_1$ to $V_n$ are detected, however, may be modified in any way. For example, they may be detected in the following order: first $V_{n-2}$, then $V_3$, and so forth. Another set of a multiplexer 9 and a differential amplifier 8 (and also an A/D converter 11) or a plurality of such sets may be provided so that a plurality of different relative voltages at different battery nodes are detected simultaneously. That is, so long as the individual relative voltages $V_1$ to $V_n$ can eventually be detected, the circuit configuration may be modified in any way.

Now, with reference to FIG. 2, a modified example of the reference node will be described. In the power supply apparatus shown in FIG. 1, the battery node located at the lowest-voltage end within the vehicle-driving battery 2, namely the battery node $P_0$, is used as the reference node. The reference node, however, may be set at any other battery node (any of the battery nodes $P_1$ to $P_n$). In this case, the battery node that is connected to the first input terminal 8A of the differential amplifier 8 also is changed.

For example, the power supply apparatus shown in FIG. 1 may be modified as shown in FIG. 2. FIG. 2 is a circuit diagram of a power supply apparatus obtained by modifying the power supply apparatus shown in FIG. 1. In FIG. 2, such components as are found also in FIG. 1 are identified with common reference symbols. Since components identified with common reference symbols have the same designs and operations, no overlapping explanations will be repeated.

The power supply apparatus shown in FIG. 2 is provided with: a vehicle-driving battery 2a composed of 14 battery modules 1 connected in series; a voltage detection circuit 3a that detects the voltages of the individual battery modules 1 provided in the vehicle-driving battery 2a; and an electronic control unit 4.

The vehicle-driving battery 2a and the voltage detection circuit 3a shown in FIG. 2 are designed in the same manner and operate in the same manner as the vehicle-driving battery 2 and the voltage detection circuit 3 shown in FIG. 1 except in the following respects. The number of battery modules 1 connected in series is specific. The battery node $P_7$ is connected to the first input terminal 8A of the differential amplifier 8 directly, i.e., without being connected via the multiplexer 9. The node that is used as the reference node $P_0$ in FIG. 1 is connected via a switching device 10 of the multiplexer 9 to the output terminal (output side) of the multiplexer 9 and to the second input terminal 8B of the differential amplifier 8.

In the power supply apparatus shown in FIG. 2, of all the battery nodes between the 14 battery modules 1, the one in the middle is used as the reference node. That is, the battery node $P_7$ located in the middle of the 14 battery modules 1 is used as the reference node. In other words, of a plurality of battery nodes, the one $P_7$ in the middle is used as the reference node. Since the relative voltages at the individual battery nodes are potentials relative to the potential at the reference node, assuming that the battery node $P_7$ is the reference node as shown in FIG. 2, the relative voltages $V_0, V_1, V_2, V_3, V_4, V_5,$ and $V_6$ at the battery nodes $P_0, P_1, P_2, P_3, P_4, P_5,$ and $P_6$ located on the negative side of the battery node (reference node) $P_7$ are detected as negative relative voltages, and the relative voltages $V_8, V_9, V_{10}, V_{11}, V_{12}, V_{13},$ and $V_{14}$ at the battery nodes $P_8, P_9, P_{10}, P_{11}, P_{12}, P_{13},$ and $P_{14}$ located on the positive side of the battery node (reference node) $P_7$ are detected as positive relative voltages. The voltages of the individual battery modules are calculated as the voltage differences between the relative voltages detected at adjacent battery nodes, and therefore, irrespective of whether the relative voltage are positive or negative, the voltages ($E_0, E_1, E_2, E_3, E_4, E_5, E_6, E_7, E_8, E_9, E_{10}, E_{11}, E_{12}, E_{13},$ and $E_{14}$) of the individual battery modules 1 can be calculated. Also in the power supply apparatus shown in FIG. 2, as in the power supply apparatus shown in FIG. 1, recovery voltages and battery module voltages are calculated according to formulae (2) to (9) noted earlier.

Needless to say, the relative voltage $V_7$ at the battery node (reference node) $P_7$ is 0 V. It should be noted that, in FIG. 2, the battery nodes $P_4$ and $P_{10}$ are omitted, and correspondingly, in FIG. 2, the symbols for the relative voltages $V_4$ and $V_{10}$ and the battery module voltages $E_4, E_5, E_{10},$ and $E_{11}$ are omitted.

The following description of the embodiment deals with the power supply apparatus shown in FIG. 1 unless otherwise stated. It should be understood, however, that all the following description applies to the power supply apparatus shown in FIG. 2.

Figure 3:
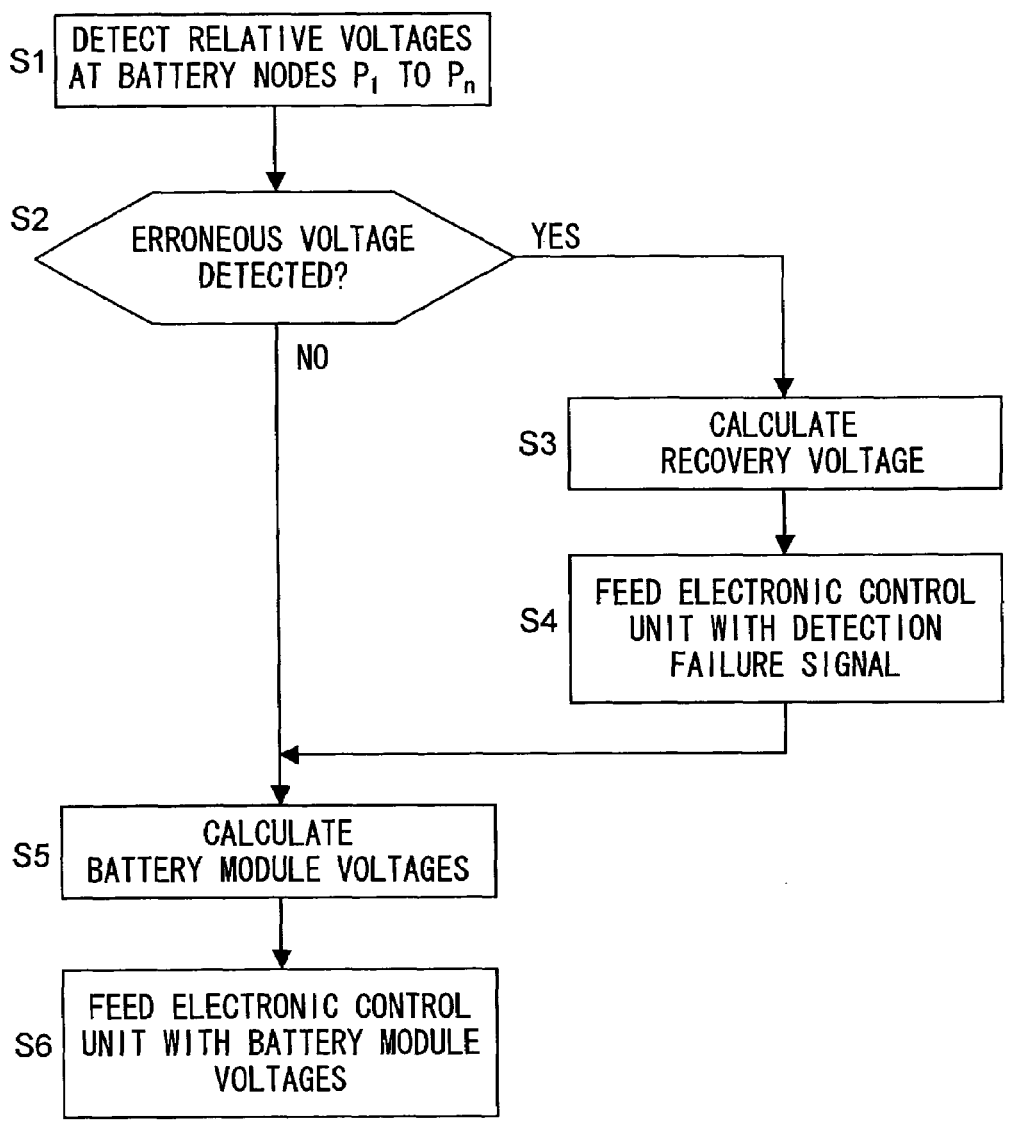
FIG. 3 is a flow chart showing the operation of the power supply apparatus shown in FIG. 1 (or FIG. 2)

FIG. 3 is a flow chart showing the operation of the power supply apparatus shown in FIG. 1. The flow chart of FIG. 3 shows the operation performed by the voltage detection circuit 3 to detect the battery module voltages $E_1$ to $E_n$ and the operation performed to transmit the detected battery module voltages $E_1$ to $E_n$ from the voltage detection circuit 3 to the electronic control unit 4. It should be noted that the power supply apparatus shown in FIG. 2 operates in the same manner as the power supply apparatus shown in FIG. 1, of which the operation is shown in FIG. 3.

In step S1, the voltage detection circuit 3 detects the relative voltages $V_1$ to $V_n$ at the individual battery nodes $P_1$ to $P_n$. On completion of step S1, in step S2, the calculation circuit 7 of the voltage detection circuit 3 checks, with one after another of the detected relative voltages $V_1$ to $V_n$, whether or not they are erroneously detected voltages. If, in step S2, any of the detected relative voltages is judged to be an erroneously detected voltage, the flow proceeds to step S3 ("Yes" in step S2). In step S3, the recovery voltage with which to replace the relative voltage judged to be an erroneously detected voltage is calculated, and then the flow proceeds to step S4. In step S4, the voltage detection circuit 3 transmits a detection failure signal to the electronic control unit 4.

On completion of step S4, the flow proceeds to step S5. Also, if, in step S2, no erroneously detected voltage is detected ("No" in step S2), the flow proceeds to step S5. In step S5, based on the relative voltages, or based on the relative voltages and recovery voltages, the voltages of the individual battery modules 1 are calculated. On completion of step S5, in step 6, the voltage detection circuit 3 transmits to the electronic control unit 4 a signal that indicates the calculated voltages of the individual battery modules 1.

Steps S1 to S6 described above are repeated at predetermined time intervals so that the voltages of the battery modules 1 are transmitted one after another from the voltage detection circuit 3 to the electronic control unit 4. Based on the voltages of the battery modules 1 fed from the voltage detection circuit 3, the electronic control unit 4 checks the states of the individual battery modules 1, and, based on the results of the checking, controls the charge or discharge current of the vehicle-driving battery 2 (battery modules 1).

Now, with reference to FIGS. 4 and 5, another method for recognizing erroneous detection will be described. The above-described distinction made by the erroneous detection checker 6 between erroneously and normally detected voltages is achieved by the use of the lowest and highest voltages $V_L$ and $V_H$. In a case where the battery modules 1 are each composed of five nickel hydride cells (not illustrated) connected in series, the lowest and highest voltages $V_L$ and $V_H$ are set, for example, at 1 V and 10 V, respectively. However, with this method (hereinafter the first erroneous detection checking method) alone, whereby erroneously and normally detected voltages are distinguished by the use of the lowest and highest voltages $V_L$ and $V_H$, it is sometimes impossible to detect comparatively small deviations in the relative voltages. That is, even if a given relative voltage contains a comparatively small deviation, with the first erroneous detection checking method alone, the relative voltage may be judged to be a normally detected voltage. Such a comparatively small deviation in a relative voltage typically results from slightly bad contact in a detection line, connector, or the like via which the relative voltage is detected.

A small deviation in a relative voltage as described above can be detected by the method described below (hereinafter the second erroneous detection checking method). The second erroneous detection checking method can be combined with the first erroneous detection checking method. When the second erroneous detection checking method is combined with the first erroneous detection checking method, the erroneous detection checker 6, by the first erroneous detection checking method, checks whether or not each relative voltage is an erroneously detected voltage or a normally detected voltage, and then further checks, by the second erroneous detection checking method, whether or not the relative voltages that have been judged to be normally detected voltages by the first erroneous detection checking method are exactly so. If a relative voltage that has been judged to be a normally detected voltage by the first erroneous detection checking method is found to contain a deviation, this relative voltage is eventually judged to be an erroneously detected voltage. If the relative voltage is found to contain no deviation by the second erroneous detection checking method, this relative voltage is eventually judged to be a normally detected voltage. As will be clear from the flowing description, to perform the checking by the second erroneous detection checking method, the voltages of the battery modules 1 need to be known. Thus, the erroneous detection checker 6 and the calculation circuit 7 cooperate to perform the second erroneous detection checking method.

Now, the second erroneous detection checking method performed in the power supply apparatus shown in FIG. 1 will be described. Needless to say, the second erroneous detection checking method may be performed also in the power supply apparatus shown in FIG. 2. FIGS. 4 and 5 are diagrams illustrating the second erroneous detection checking method. Suppose now that, based on detected relative voltages $V_{q-1}$, $V_q$, and $V_{q+1}$, battery module voltages $E_q$ and $E_{q+1}$ have already been calculated. Let these battery module voltages $E_q$ and $E_{q+1}$ be E00 and E01, respectively. Moreover, assume that the relative voltages $V_{q-1}$, $V_q$, and $V_{q+1}$ all have been judged to be normally detected voltages by the first erroneous detection checking method. Assume also that the detected relative voltages $V_{q-1}$ and $V_{q+1}$ are equal to the true relative voltages, and thus contain no deviations at all. Further assume that, on the other hand, the relative voltage $V_q$ contains a deviation resulting from bad contact or the like in the line, connector, or the like via which it is detected, and thus that the detected relative voltage $V_q$ differs from the true relative voltage.

Figure 4:
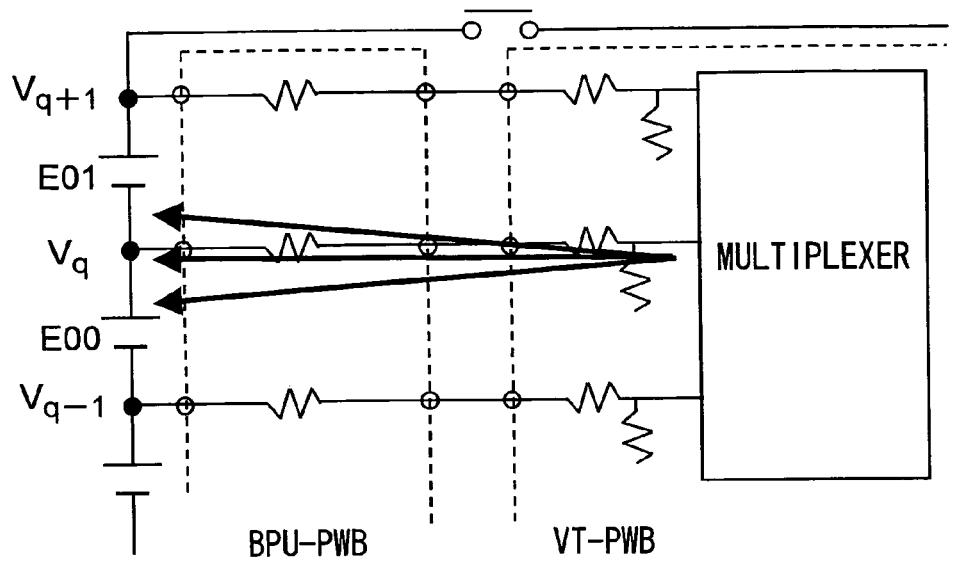
FIG. 4 is a diagram illustrating how an erroneously detected voltage is recognized as such as can actually be performed in the power supply apparatus shown in FIG. 1 (or FIG. 2)
Figure 5:
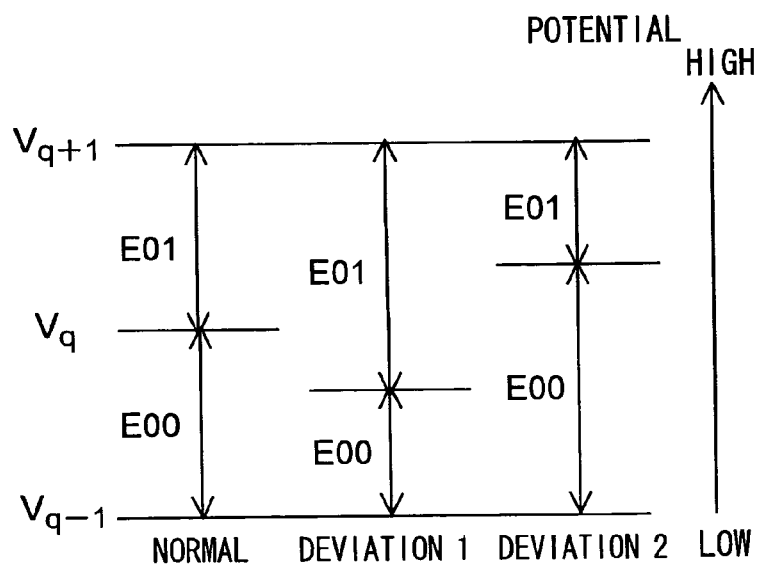
FIG. 5 is a diagram illustrating how an erroneously detected voltage is recognized as such as can actually be performed in the power supply apparatus shown in FIG. 1 (or FIG. 2)

In FIG. 4, for easier understanding, a positive and a negative deviation of the detected relative voltage $V_q$ are graphically represented by an upward inclined and a downward inclined arrow. When the detected relative voltage $V_q$ contains a deviation, as compared when it contains no deviation (in the normal state), either the voltage E01 on one side becomes higher and the other voltage E00 lower (see "deviation 1" in FIG. 5) or the voltage E01 on one side becomes lower and the other voltage E00 higher (see "deviation 2" in FIG. 5). That is, it becomes impossible to accurately detect the battery module voltages $E_q$ and $E_{q+1}$.

According to the second erroneous detection checking method, whether or not the detected relative voltage $V_q$ contains a deviation is checked in the following manner. First, the voltage deviation dif1 of the voltage E00 from the mean voltage MMV of the normal voltage of the battery modules 1 and the voltage deviation dif2 of the voltage E01 from the mean voltage MMV are calculated according to formula (10) below. Here, the mean voltage MMV is the mean value of the voltages of the battery modules 1 as calculated by using only the relative voltages that have been judged to be normally detected voltages by the first erroneous detection checking method.

$$\left. \begin{array}{l} dif1 = E00 - MMV \\ dif2 = E01 - MMV \end{array} \right\} \quad (10)$$

Then, whether or not either of the absolute values of the voltage deviations dif1 and dif2 is greater than a predetermined first set voltage (for example, 400 mV) is checked. This checking is called "checking 1". If either of the absolute values of the voltage deviations dif1 and dif2 is greater than the predetermined first set voltage, checking 1 is fulfilled (affirmed). What is performed by the first erroneous detection checking method is to check for an erroneously detected voltage by using a value greater than the first set voltage. Thus, what is performed as checking 1 is to check for deviations in those relative voltages that have not been judged to be erroneously detected voltages by the first erroneous detection checking method.

Next, whether or not the absolute value of the sum of the voltage deviations dif1 and dif2 is smaller than a predetermined second set voltage (for example, 70 mV) is checked. That is, whether or not the absolute value of the difference between the sum of the voltages E00 and E01 and twice the mean voltage MMV is smaller than the second set voltage is checked. This is called "checking 2." If the absolute value of the sum of the voltage deviations dif1 and dif2 is smaller than the predetermined second set voltage, checking 2 is fulfilled (affirmed). What is performed as checking 2 is to check for a deviation in the relative voltage detected between the battery modules 1 corresponding to the voltages E00 and E01.

If checking 1 and 2 described above are both fulfilled, the detected relative voltage $V_q$ is judged to contain a deviation. That is, the detected relative voltage $V_q$ is judged to be an erroneously detected voltage by the second erroneous detection checking method. Otherwise, i.e., unless both checking 1 and 2 described above are fulfilled, the detected relative voltage $V_q$ is judged to be a normally detected voltage also by the second erroneous detection checking method.

Also for any relative voltage $V_q$ that is judged to be an erroneously detected voltage by the second erroneous detection checking method, a recovery voltage $VR_q$ is calculated according to formula (2) etc. noted earlier. Then, with the detected relative voltage $V_q$ replaced with the recovery voltage $VR_q$, the voltages of the individual battery modules 1 are definitively calculated according to formula (6) noted earlier. Alternatively, when a detected relative voltage $V_q$ is judged to be an erroneously detected voltage by the second erroneous detection checking method, the voltages of the individual battery modules 1 may be definitively calculated according to formula (8) noted earlier without calculating a recovery voltage $VR_q$. In this case, the battery module voltages $E_q$ and $E_{q+1}$ of the battery modules 1 adjacent to the battery node $P_q$ corresponding to the relative voltage $V_q$ judged to be an erroneously detected voltage are both determined as equal to $(V_{q+1} - V_{q-1})/2$.

Also in this case, the battery module voltages given by formula (8) are calculated by using the relative voltages given by formula (2). Thus, the method by which the battery module voltages are calculated here can be said to be just the method whereby, first, a recovery voltage is calculated by dividing into equal parts the two relative voltages detected at the two battery nodes located adjacently on the positive and negative sides of the battery node at which an erroneously detected voltage is being detected, then the relative voltage at the battery node at which the erroneously detected voltage is being detected is replaced with the recovery voltage, and then the battery module voltages are calculated.

Next, with reference to FIG. 6, the terminal connection structure that permits the measurement of the relative voltages $V_1$ to $V_n$ at the battery nodes $P_1$ to $P_n$ will be described.

First, a description will be given of a common terminal connection structure, which is different from that adopted in the power supply apparatuses shown in FIGS. 1 and 2. Typically, a voltage detection terminal fitted at the tip end of a lead whose other end is connected to a voltage detection circuit is arranged on top of the overlap between the electrodes of adjacent battery modules, and these are fixed together with a screw (none of them are illustrated). This permits the detection of the voltage at the battery node between adjacent battery modules.

With this structure, hardly any electric current flows between the voltage detection terminal and the terminals (electrodes) of the battery modules. This is because the input impedance of the voltage detection circuit is extremely high. In a structure like this where hardly any electric current flows between two terminals that are kept in contact with each other, the contact surfaces of the terminals cannot be stimulated with electric current, and thus the contact tends to degrade quickly. This problem on the contact surfaces can be avoided by adopting a structure in which terminals for voltage detection are soldered together. However, in a large-size battery like the one under discussion in this embodiment, the soldered spot cannot be heated sufficiently to produce satisfactory soldering strength. Moreover, soldering increases the time needed for assembly and disassembly. These considerations prevent the adoption of the soldered structure. With the contact degraded as described above, it is impossible to accurately detect the voltages of the battery modules.

This problem can be overcome by passing a pulse current between the voltage detection terminal fitted at the tip end of the lead and the electrodes of the battery modules. This, however, cannot be achieved without providing a dedicated circuit (not illustrated), and thus complicates the circuit configuration. In particular, in a case where a large number of battery modules are connected in series, the large number of spots at which to detect voltages makes the circuit configuration extremely complicated. The problem can also be overcome by detecting the voltage while passing a current of the order of several mA via the voltage detection terminal. This current, however, may affect the detected voltages of the battery modules. Thus, in a structure like the one described above, it is undesirable to pass a large current via the voltage detection terminal.

Figure 6:
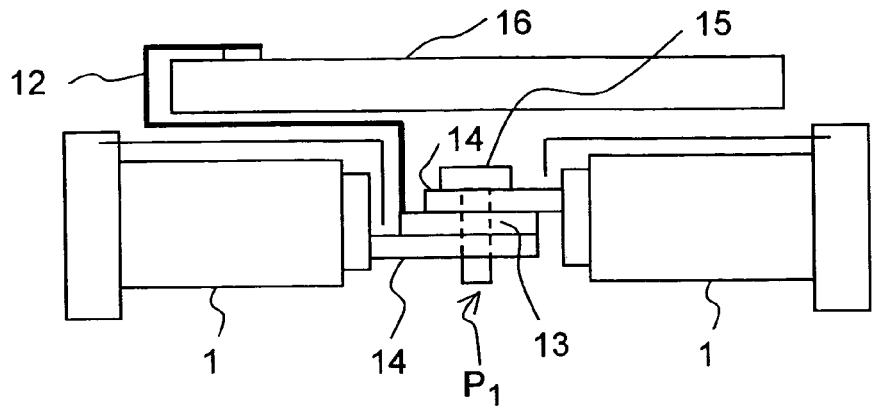
FIG. 6 is an enlarged partial view of one battery node in the power supply apparatus shown in FIG. 1 (or FIG. 2), showing how a terminal is connected to a battery node.

To overcome these inconveniences, in the power supply apparatuses shown in FIGS. 1 and 2, a terminal connection structure as shown in FIG. 6 is adopted (though its adoption is not compulsory). FIG. 6 is an enlarged view of a portion around the battery node $P_1$, and shows the connection structure of a terminal (corresponding to the connection terminal 13 and the electrode terminals 14 described later) at the battery node $P_1$. The connection structure of the terminal at other battery nodes (such as the battery node $P_2$) is the same as that at the battery node $P_1$. In FIG. 6, such parts as are found also in FIGS. 1 and 2 are identified with common reference symbols.

A connection terminal 13 that is connected to a lead 12 is sandwiched between the electrode terminals 14 of two battery modules 1 that are connected in series with each other. The connection terminal 13 and the two electrode terminals 14 are fixed together with a screw 15 so as to be electrically connected together. With this structure, the large charge or discharge current that flows between the electrode terminals 14 of the serially connected battery modules 1 flows via the connection terminal 13. That is, a large current flows between the connection terminal 13 and the electrode terminals 14 of the battery modules 1, and this current stimulates the contact between the connection terminal 13 and the electrode terminals 14, maintaining good contact between them. This makes it possible to accurately detect the voltages of the battery modules 1. Moreover, the end of the lead 12 opposite to the connection terminal 13 is soldered directly to a circuit board 16 for voltage detection so as to be electrically connected to the multiplexer 9 (see FIG. 1). This permits the relative voltage $V_1$ to be detected accurately. Incidentally, on the circuit board 16 are mounted the voltage detection circuit 3 (see FIG. 1) etc.

Figure 7:
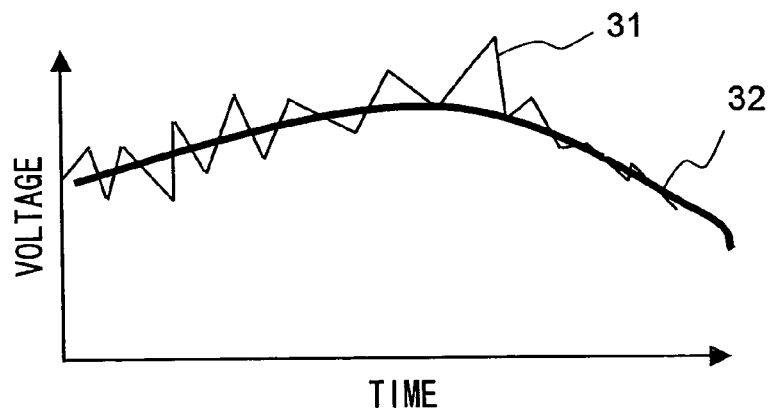
FIG. 7 is a diagram illustrating the function of the low-pass filter adopted in the power supply apparatus shown in FIG. 1 (or FIG. 2)

Next, with reference to FIGS. 7 and 8, the method for removing noise and other unnecessary components contained in the signal indicating a detected relative voltage (for example, the relative voltage $V_1$) will be described. As shown in FIG. 7, noise contained in a digital voltage signal detected at fixed sampling intervals by an A/D converter (for example, the A/D converter 11 shown in FIG. 1) can be eliminated by the use of a digital low-pass filter. In FIG. 7, the line 31 represents a voltage signal observed when no low-pass filter is provided, and the line 32 represents the voltage signal having passed through a low-pass filter. Such a low-pass filter can be built on a hardware basis in the form of an electronic circuit (not illustrated), or may be realized on a software basis by performing signal processing through calculation according to formula (11) below.

$$Y(t_m) = 0.75 \times Y(t_{m-1}) + 0.25 \times X(t_m) \quad (11)$$

Here, $X(t_m)$ represents a relative voltage (for example, the relative voltage $V_1$) sampled at a given time point $t_m$, $Y(t_m)$ represents the relative voltage sampled at the time point $t_m$ and then subjected to processing by a low-pass filter, and $Y(t_{m-1})$ represents the relative voltage sampled at a previous sampling time point $t_{m-1}$ and then subjected to the processing by the low-pass filter. Needles to say, the length of time between the time point $t_m$ and the time point $t_{m-1}$ equals the reciprocal of the sampling interval. Moreover, formula (11) is used with respect to the relative voltage (for example, the relative voltage $V_1$) corresponding to one arbitrary battery node (for example, the battery node $P_1$) currently of interest.

In formula (11), making the coefficient 0.75 greater and simultaneously making the coefficient 0.25 smaller intensifies the filtering function, and thus helps eliminate noise comparatively powerfully. This, however, slackens the response to an abrupt variation in the relative voltage, and thus makes it impossible to accurately measure the relative voltage at the time of sampling.

Figure 8:
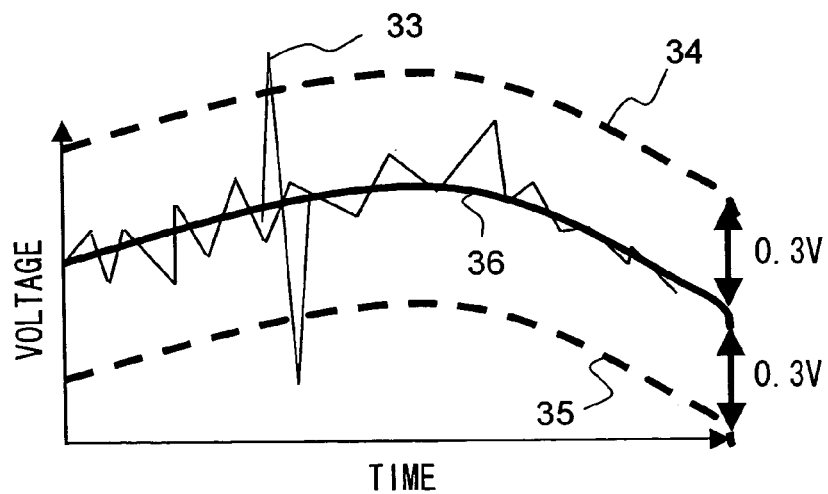
FIG. 8 is a diagram illustrating the functions of the low-pass filter and the blocking filter adopted in the power supply apparatus shown in FIG. 1 (or FIG. 2).

As shown in FIG. 8, using a low-pass filter in combination with a blocking filter makes it possible to effectively prevent detection errors resulting from noise or the like. In FIG. 8, the line 33 represents the voltage signal observed after a digital signal is subjected to A/D (analog-to-digital) conversion at fixed sampling interval and then to processing by a low-pass filter.

The blocking filter that performs signal processing passes a signal only within a predetermined voltage range indicated by the two broken lines 34 and 35, and eliminates peak voltages that fall outside the voltage range indicated by the broken lines 34 and 35, thereby eliminating peak voltages resulting from noise. For example, the blocking filter eliminates voltage components 0.3 V or more higher than the center voltage on the positive side and voltage components 0.3 V or more lower than the center voltage on the negative side. Through such combined use of the blocking filter, it is possible to obtain a voltage signal indicated by the line 36 from the voltage signal indicated by the line 33.

Now, a description will be given of the signal processing performed by this blocking filter. In the line 33 shown in FIG. 8, voltage components 0.3 V or more higher than the center voltage indicated by the line 36 on the positive side and voltage components 0.3 V or more lower than the center voltage on the negative side are regarded as noise (spike noise), and is eliminated in the following manner.

First, from the voltage signal having passed through the low-pass filter, the battery module voltage (for example, the battery module voltage $E_1$) is calculated. If this battery module voltage is 0.3 V or more higher (or lower) than the previously calculated battery module voltage (this is called the reference module voltage), this previously calculated battery module voltage (reference module voltage) is transmitted to the calculation circuit 7.

If, for example, the battery module voltage obtained from the voltage signal having passed through the low-pass filter is found, three consecutive times, to be 0.3 V or more higher (or lower) than the initially transmitted reference module voltage, then the battery module voltage is recognized to have actually varied abruptly, and the calculation circuit 7 transmits the calculated battery module voltage to the electronic control unit 4. On the other hand, if the battery module voltage obtained from the voltage signal having passed through the low-pass filter is found, less than three consecutive times, to be 0.3 V or more higher (or lower) than the initially transmitted reference module voltage, then the reference module voltage is recognized as correct.

In a power supply apparatus, in particular in a vehicle-oriented one, if a detection line via which to detect a relative voltage or the like breaks, this greatly affects electrical control and arithmetic processing. To avoid this, two detection lines may be provided for the detection of a relative voltage or the like. For example, two detection lines are provided for the detection of the relative voltage $V_n$ at the battery node $P_n$ shown in FIG. 1. In this case, the relative voltage detected via one detection line (hereinafter the relative voltage $V_{na}$) may differ from the relative voltage detected via the other detection line (hereinafter the relative voltage $V_{nb}$). The voltage of the battery module 1 located between the battery nodes $P_n$ and $P_{n-1}$ is calculated based on the relative voltage $V_{na}$ (the calculated voltage will be called the voltage $E_{na}$) and also based on the relative voltage $V_{nb}$ (the calculated voltage will be called the voltage $E_{nb}$). Then, each of the voltages $E_{na}$ and $E_{nb}$ is compared with the mean value of the voltage of the battery module 1 as regarded as normal, and whichever relative voltage ($V_{na}$ or $V_{nb}$) yields the voltage ($E_{na}$ or $E_{nb}$) closer to that mean value is eventually adopted as the detected relative voltage $V_n$. Alternatively, when the relative voltages $V_{na}$ and $V_{nb}$ differ, their mean value may eventually be adopted as the detected relative voltage $V_n$. This makes it possible to detect a relative voltage closer to its true value.

Providing two detection lines for every battery node helps detect the relative voltages and battery module voltages with higher reliability, but increases the production and other costs. It is therefore recommended, for example in FIG. 1, that the detection line that connects the reference node $P_0$ to the first input terminal 8A of the differential amplifier 8 be composed of two detection lines, and that the detection line via which to detect the relative voltage $V_n$ at the battery node $P_n$ be composed of two detection lines. On the other hand, in FIG. 2, it is recommended that the detection line that connects the reference node $P_7$ to the first input terminal 8A of the differential amplifier 8 be composed of two detection lines, that the detection line via which to detect the relative voltage $V_0$ at the battery node $P_0$ be composed of two detection lines, and that the detection line via which to detect the relative voltage $V_{14}$ at the battery node $P_{14}$ be composed of two detection lines. This is because, if any of these lines breaks, it becomes impossible to calculate the recovery voltages described above. Needless to say, any other detection line may be composed of two detection lines.

What is claimed is:

1. A power supply apparatus comprising:
    a battery that is composed of n, where n is an integer equal to or greater than 2, battery modules connected in series;
    a voltage detection circuit that detects voltages of the individual battery modules of the battery; and
    an electronic control unit that controls charging and discharging of the battery based on the voltages of the individual battery modules as detected by the voltage detection circuit,
    wherein the voltage detection circuit comprises:
    a voltage detector that detects relative voltages between a predetermined reference node within the battery and each of nodes between the battery modules connected in series;
    an erroneous detection checker that checks whether each of the relative voltages detected by the voltage detector is an erroneously detected voltage or a normally detected voltage; and a calculation circuit that calculates the voltages of the individual battery modules based on the relative voltages judged to be normally detected voltages, wherein, if one of the nodes is recognized as an erroneous detection node as a result of the corresponding relative voltage being judged to be an erroneously detected voltage by the erroneous detection checker, the calculation circuit calculates, based on the relative voltages detected at the two nodes located adjacently on positive and negative sides of the erroneous detection node, a recovery voltage for the erroneous detection node, and then, by replacing the relative voltage detected at the erroneous detection node with the recovery voltage, calculates the voltages of the battery modules.

2. The power supply apparatus of claim 1, wherein the calculation circuit calculates the recovery voltage by calculating a mean value of the relative voltages detected at the two nodes.

3. The power supply apparatus of claim 1, wherein, upon recognition of the erroneous detection node, the calculation circuit calculates the voltages of the battery modules by using the recovery voltage, and the voltage detection circuit feeds the electronic control unit with a detection failure signal indicating failure in detection of the voltages of the battery modules.

4. The power supply apparatus of claim 1, wherein, upon recognition of the erroneous detection node, the calculation circuit, by using the recovery voltage, calculates the voltage of one of the two battery modules connected to the erroneous detection node, and the voltage detection circuit notifies the electronic control unit of failure in detection of the voltage of the other of the two battery modules.

5. The power supply apparatus of claim 1, wherein, of all the nodes between the battery modules connected in series, the node located in a middle is used as the reference node.

6. The power supply apparatus of claim 1, wherein the voltage detector includes a multiplexer of which an input side is connected to the individual nodes, and the relative voltages are detected one after another as a result of the nodes being connected one after another to an output side of the multiplexer.

7. A power supply apparatus comprising:
a battery that is composed of n, where n is an integer equal to or greater than 2, battery modules connected in series;
a voltage detection circuit that detects, voltages of the individual battery modules of the battery; and
an electronic control unit that controls charging and discharging of the battery based on the voltages of the individual battery modules as detected by the voltage detection circuit,
wherein the voltage detection circuit comprises:
a voltage detector that detects relative voltages between a predetermined reference node within the battery and each of nodes between the battery modules connected in series;
an erroneous detection checker that checks whether each of the relative voltages detected by the voltage detector is an erroneously detected voltage or a normally detected voltage; and
a calculation circuit that calculates the voltages of the individual battery modules based on the relative voltages judged to be normally detected voltages wherein, if consecutive C, where C is an integer equal to or greater than 2 and fulfilling C≦n−1, of the nodes are recognized as erroneous detection nodes as a result of the corresponding relative voltages being judged to be erroneously detected voltages by the erroneous detection checker, the calculation circuit calculates, based on the relative voltages detected at the two nodes located adjacently on positive and negative sides of a node group consisting of the C erroneous detection nodes, recovery voltages respectively for the C erroneous detection nodes, and then, by respectively replacing the relative voltages detected at the erroneous detection nodes with the recovery voltages, calculates the voltages of the battery modules.

8. The power supply apparatus of claim 7, wherein the calculation circuit calculates the recovery voltages respectively for the C erroneous detection nodes by dividing the relative voltages detected at the two nodes into equal parts.

9. The power supply apparatus of claim 7, wherein, when a voltage between the relative voltages detected at the two nodes is divided into (C+1) equal parts with respect to a potential at the reference node, and the resulting C voltages are called, from a negative side, a first voltage, a second voltage, . . . , a (C—1)th voltage, and a Cth voltage, the calculation circuit calculates the recovery voltages so that the recovery voltages calculated as corresponding respectively to the C erroneous detection nodes equal, from a negative side thereof, the first voltage, the second voltage, . . . , the (C−1)th voltage, and the Cth voltage.

10. The power supply apparatus of claim 7, wherein, upon recognition of the erroneous detection nodes, the calculation circuit calculates the voltages of the battery modules by using the recovery voltages, and the voltage detection circuit feeds the electronic control unit with a detection failure signal indicating failure in detection of the voltages of the battery modules.

11. The power supply apparatus of claim 7, wherein, of all the nodes between the battery modules connected in series, the node located in a middle is used as the reference node.

12. The power supply apparatus of claim 7, wherein the voltage detector includes a multiplexer of which an input side is connected to the individual nodes, and the relative voltages are detected one after another as a result of the nodes being connected one after another to an output side of the multiplexer.

13. A power supply apparatus comprising:
a battery that is composed of n, where n is an integer equal to or greater than 2, battery modules connected in series;
a voltage detection circuit that detects voltages of the individual battery modules of the battery; and
an electronic control unit that controls charging and discharging of the battery based on the voltages of the individual battery modules as detected by the voltage detection circuit,
wherein the voltage detection circuit comprises:
a voltage detector that detects relative voltages between a predetermined reference node within the battery and each of nodes between the battery modules connected in series;
an erroneous detection checker that checks whether each of the relative voltages detected by the voltage detector is an erroneously detected voltage or a normally detected voltage; and
a calculation circuit that calculates the voltages of the individual battery modules based on the relative voltages judged to be normally detected voltages, wherein, if one of the nodes is recognized as an erroneous detection node as a result of the corresponding relative voltage being judged to be an erroneously detected voltage by the erroneous detection checker, the calculation circuit calculates, based on a voltage difference between the relative voltages detected at the two nodes located adjacently on positive and negative sides of the erroneous detection node, the voltages of two battery modules adjacent to the erroneous detection node.

14. The power supply apparatus of claim 13,
wherein the calculation circuit calculates the voltages of the two battery modules by dividing the voltage difference into two equal parts.

15. A power supply apparatus comprising:
a battery that is composed of n, where n is an integer equal to or greater than 2, battery modules connected in series;
a voltage detection circuit that detects voltages of the individual battery modules of the battery; and
an electronic control unit that controls charging and discharging of the battery based on the voltages of the individual battery modules as detected by the voltage detection circuit,
wherein the voltage detection circuit comprises:
a voltage detector that detects relative voltages between a predetermined reference node within the battery and each of nodes between the battery modules connected in series;
an erroneous detection checker that checks whether each of the relative voltages detected by the voltage detector is an erroneously detected voltage or a normally detected voltage; and
a calculation circuit that calculates the voltages of the individual battery modules based on the relative voltages judged to be normally detected voltages,
wherein, if consecutive C, where C is an integer equal to or greater than 2 and fulfilling $C \leq n-1$, of the nodes are recognized as erroneous detection nodes as a result of the corresponding relative voltages being judged to be erroneously detected voltages by the erroneous detection checker, the calculation circuit calculates, based on a voltage difference between the relative voltages detected at the two nodes located adjacently on positive and negative sides of a node group consisting of the C erroneous detection nodes, the voltage of each of a total of (C+1) battery modules adjacent to every erroneous detection node.

16. The power supply apparatus of claim 15,
wherein the calculation circuit calculates the voltages of the (C+1) battery modules by dividing the voltage difference into equal parts.

17. The power supply apparatus of claim 15,
wherein the calculation circuit calculates the voltage of each of the (C+1) battery modules as equal to the voltage difference divided into (C+1) equal parts.

* * * * *